US005548615A

United States Patent [19]
Wei

[11] Patent Number: 5,548,615
[45] Date of Patent: Aug. 20, 1996

[54] METHODS AND APPARATUS FOR ROTATIONALLY INVARIANT MULTILEVEL CODING

[75] Inventor: Lee-Fang Wei, Lincroft, N.J.

[73] Assignee: AT&T Corp., Murray Hill, N.J.

[21] Appl. No.: 57,060

[22] Filed: May 3, 1993

[51] Int. Cl.⁶ .......................... H04L 27/10; H04L 25/34; H04L 5/12; G06F 11/10
[52] U.S. Cl. .......................... 375/281; 375/286; 375/265; 371/43; 371/37.1
[58] Field of Search .................................. 375/39, 17, 54, 375/53, 281, 261, 286, 280; 371/43, 37.1

[56] References Cited

U.S. PATENT DOCUMENTS

| | | | |
|---|---|---|---|
| 4,713,817 | 12/1987 | Wei | 371/43 |
| 4,873,701 | 10/1989 | Tretter | 375/27 |
| 5,029,185 | 7/1991 | Wei . | |
| 5,307,377 | 4/1994 | Chouly et al. | 375/39 |

OTHER PUBLICATIONS

Tretter, "An Eight–Dimensional 64–State Trellis Code for . . ."*IEEE Jrnl. Selected Areas In Comm.*, vol. 7, No. 9, Dec. 89, pp. 1392–95.

Wei "Rotationally Invariant Trellis–Coded Modulations . . .", *IEEE Jrnl. Selected Areas In Comm.*, vol. 7, No. 9, Dec. 89, pp. 1281–9.

Wu et al., "Multilevel Trellis MPSK Modulation Codes For . . .", *IEEE Transactions On Comm.*, vol. 41, No. 9, Sep. 93, pp. 1311–18.

Primary Examiner—Edward L. Coles, Sr.
Assistant Examiner—Allan A. Esposo
Attorney, Agent, or Firm—Gerard A. deBlasi; Steven R. Bartholomew

[57] ABSTRACT

A rotationally invariant, multilevel coded modulation scheme is provided by partitioning a constellation, such as an M-PSK or QAM constellation, into several trellis-subsets, each of which is further partitioned into block subsets. The input bits are then encoded to select a signal point from the constellation. A first portion of the input bits are differentially encoded. A second portion of the input bits, together with at least one of the differentially encoded bits, are trellis encoded to select a trellis subset of the constellation. A third portion of the input bits—excluding any differentially encoded bits —are block encoded to select a block subset from the selected trellis subset. A fourth portion of the input bits, together with the remaining differentially encoded bits, are used to select a signal point from the selected block subset.

26 Claims, 25 Drawing Sheets

FIG. 11
| Y1$_n$ | Y0$_n$ | (P$_n$, P$_{n+1}$) |
|---|---|---|
| 0 | 0 | (0, 0) |
| 0 | 1 | (1, 3) |
| 1 | 0 | (2, 4) |
| 1 | 1 | (1, 1) |
FIG. 12
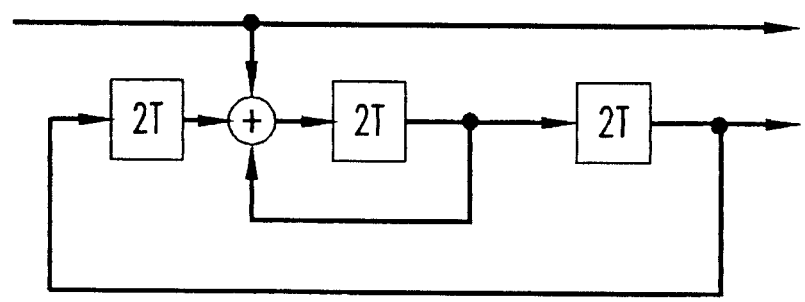
FIG. 13
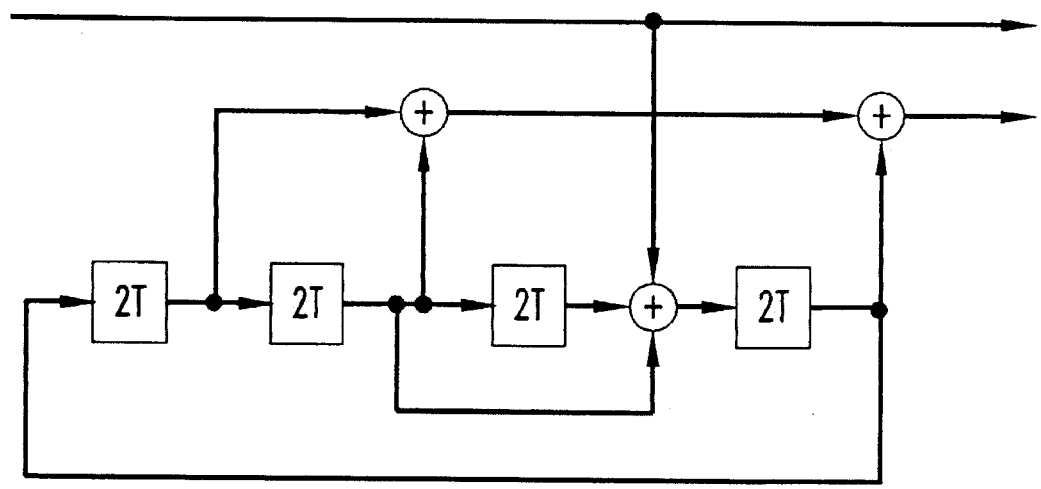

BIT PATTERN: $Z6_n\ Z5_n\ Z4_n\ Z3_n$

FIG. 22

| $Z2_n$ $Z1_n$ $Z0_n$ | 2D BLOCK SUBSET |
|---|---|
| 0 0 0 | $A_0$ |
| 0 0 1 | $C_0$ |
| 0 1 0 | $B_0$ |
| 0 1 1 | $D_0$ |
| 1 0 0 | $A_1$ |
| 1 0 1 | $C_1$ |
| 1 1 0 | $B_1$ |
| 1 1 1 | $D_1$ |

FIG. 31

| INPUT BITS | | | | OUTPUT BITS | | | |
|---|---|---|---|---|---|---|---|
| $Y3_n$ | $Y2_n$ | $Y1_n$ | $Y0_n$ | $Z1_n$ | $Z0_n$ | $Z1_{n+1}$ | $Z0_{n+1}$ |
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 1 | 0 |
| 0 | 0 | 1 | 1 | 0 | 0 | 1 | 1 |
| 0 | 1 | 0 | 0 | 0 | 1 | 0 | 1 |
| 0 | 1 | 0 | 1 | 0 | 1 | 1 | 0 |
| 0 | 1 | 1 | 0 | 0 | 1 | 1 | 1 |
| 0 | 1 | 1 | 1 | 0 | 1 | 0 | 0 |
| 1 | 0 | 0 | 0 | 1 | 0 | 1 | 0 |
| 1 | 0 | 0 | 1 | 1 | 0 | 1 | 1 |
| 1 | 0 | 1 | 0 | 1 | 0 | 0 | 0 |
| 1 | 0 | 1 | 1 | 1 | 0 | 0 | 1 |
| 1 | 1 | 0 | 0 | 1 | 1 | 1 | 1 |
| 1 | 1 | 0 | 1 | 1 | 1 | 0 | 0 |
| 1 | 1 | 1 | 0 | 1 | 1 | 0 | 1 |
| 1 | 1 | 1 | 1 | 1 | 1 | 1 | 0 |

FIG. 32

| INPUT BITS | | | OUTPUT BITS | | | |
|---|---|---|---|---|---|---|
| $Y12_n$ | $Y11_n$ | $Y10_n$ | $Z6_n$ | $Z5_n$ | $Z6_{n+1}$ | $Z5_{n+1}$ |
| 0 | 0 | 0 | 0 | 0 | 0 | 0 |
| 0 | 0 | 1 | 0 | 0 | 0 | 1 |
| 0 | 1 | 0 | 0 | 1 | 0 | 0 |
| 0 | 1 | 1 | 0 | 1 | 0 | 1 |
| 1 | 0 | 0 | 1 | 0 | 0 | 0 |
| 1 | 0 | 1 | 1 | 0 | 0 | 1 |
| 1 | 1 | 0 | 0 | 0 | 1 | 0 |
| 1 | 1 | 1 | 0 | 1 | 1 | 0 | ns.
METHODS AND APPARATUS FOR ROTATIONALLY INVARIANT MULTILEVEL CODING

FIELD OF THE INVENTION

The present invention relates to multilevel coded modulation useful, for example, in satellite communication and voiceband data transmission (e.g., modem) applications.

BACKGROUND OF THE INVENTION

As used herein, the term "multilevel coded modulation" refers to arrangements in which input bits are divided into two or more groups which are individually encoded using respective redundancy codes. The encoded bits are then used jointly to select channel signal points from a predetermined signal constellation for transmission over a communication channel, such as a voiceband telephone channel. The principal advantage of adopting a multilevel coded modulation approach is that it provides the system designer with increased flexibility in designing a coding scheme which provides desired levels of error-rate performance, or "coding gain," while meeting various constraints on code complexity and decoding delay.

It also is desirable that modulation codes be invariant to rotations of the transmitted signal points by a phase ambiguity of the constellation. A code is said to be "rotationally invariant" when a valid sequence of signal points becomes another valid sequence of signal points after each point is rotated by a phase angle corresponding to a phase ambiguity of the constellation. Unless the codes are rotationally invariant, after such a rotation, the receiver will be unable to recover the bits that are associated with the signal points.

However, it is difficult to obtain rotational invariance in multilevel codes, especially where a large amount of coding gain is desired and when the constellation has more than two phase ambiguities.

SUMMARY OF THE INVENTION

A rotationally invariant, multilevel coded modulation scheme suitable for use with constellations having more than two phase ambiguities is provided in accordance with the principles of the invention. A constellation, such as an M-PSK or QAM constellation, is first partitioned into a first group of subsets and then partitioning each of the subsets into a respective second group of subsets. The partitioning is done such that the first and second groups of subsets are invariant to the same amounts of phase rotation.

In an exemplary embodiment of the invention, which uses the partitioning scheme described above, and in which the partitioning is done such that the intra-subset minimum square Euclidian distance (MSED) of each second group of subsets is greater than that of the respective first group of subsets, which in turn, is greater than that of the overall constellation, a rotationally invariant, multilevel code is provided in which input bits are used to select a signal point from the constellation. A first portion of the input bits are first differentially encoded. A second portion of the input bits, together with at least one of the diffentially encoded bits, are trellis encoded to select a "trellis subset" from the first group of subsets of the constellation. A third portion of the input bits—excluding any differentially encoded bits— are block encoded to select a "block subset" from the second group of subsets of the previously selected trellis subset. A fourth portion of the input bits, together with the remaining differentially encoded bits, are used to select a signal point from the selected block subset.

BRIEF DESCRIPTION OF THE DRAWINGS

In the drawings:

FIG. 11 is a table used to implement the 4D constellation mapping in the constellation mapper of FIG. 8;

FIGS. 12–14 are alternative embodiments of the trellis encoder of FIG. 5;

FIG. 22 is a table used to implement the selection of block subsets in the 2D constellation mapping of FIG. 21;

FIGS. 31 and 32 are tables for implementing the bit converter and the fractional bit encoder, respectively, of FIG. 30.

DETAILED DESCRIPTION

Figure 1:
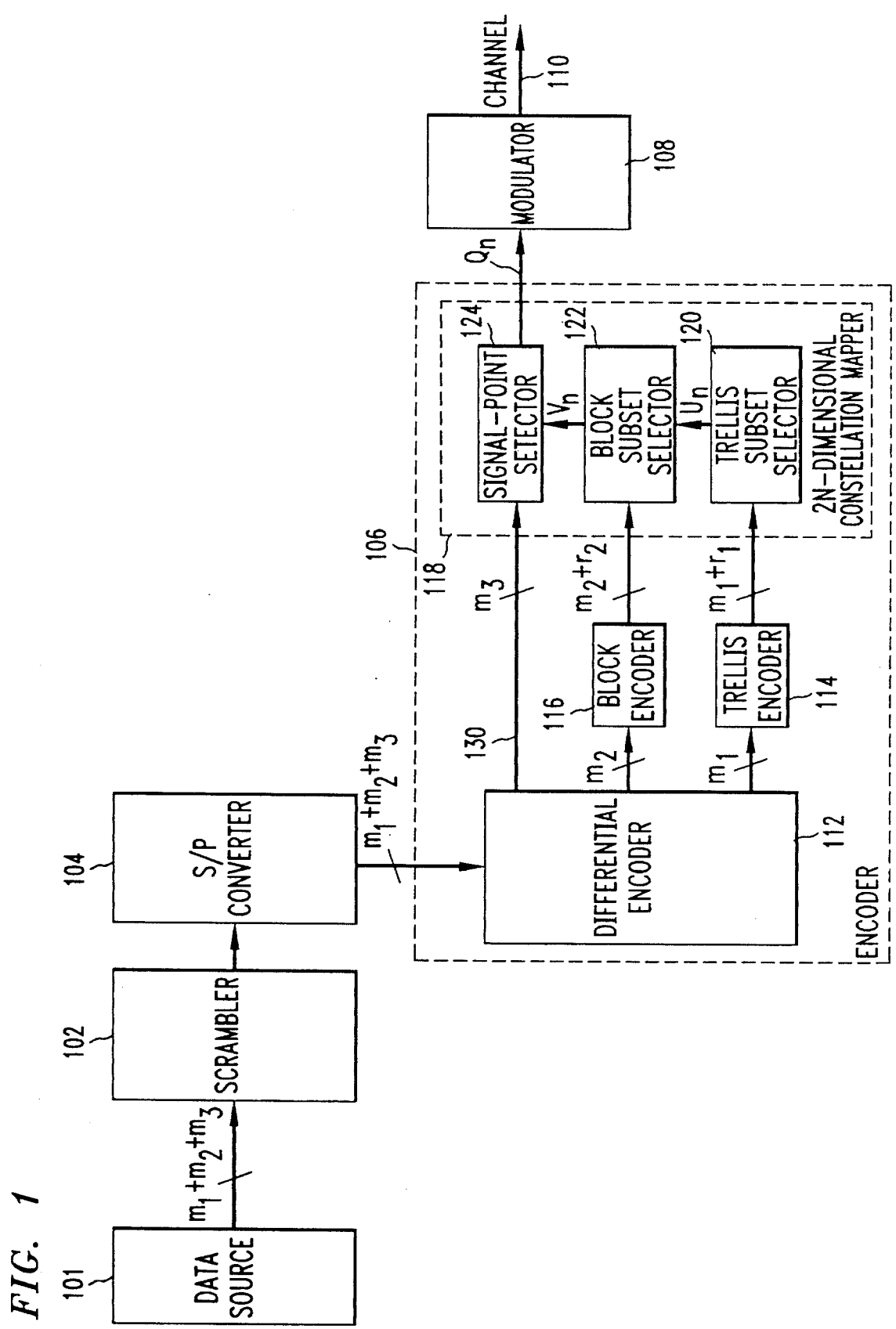
FIGS. 1 and 2 are block diagrams of the transmitter and receiver portions, respectively, of a communication system constructed in accordance with the principles of the invention.
Figure 2:
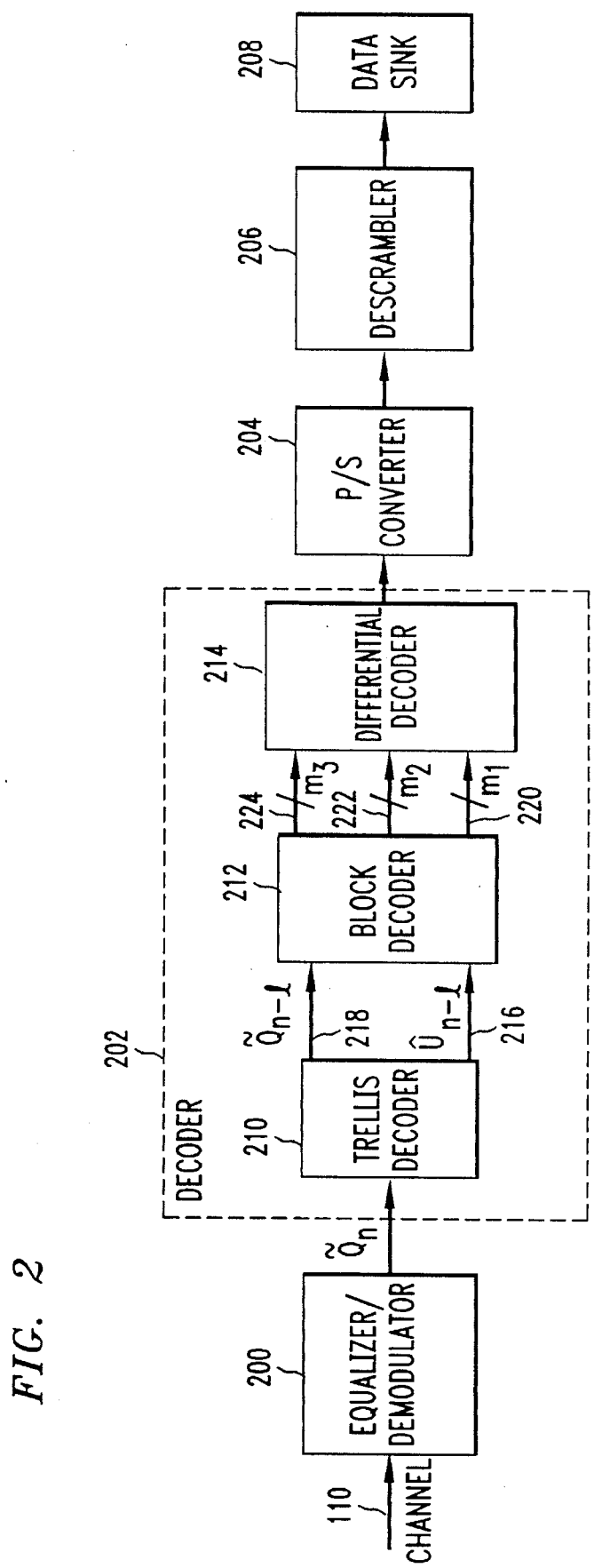

Referring now to the drawings, FIGS. 1 and 2 show the transmitter and receiver portions, respectively, of a communication system constructed in accordance with the principles of the invention. In FIG. 1, a stream of bits from a data source 101, such as a computer terminal, is clocked into a scrambler 102, which randomizes the bits in a conventional manner. The serial bit stream output from scrambler 102 is provided to a serial-to-parallel converter 104, which provides parallel output bits to an encoder 106. As described below, encoder 106 encodes the bits in accordance with the invention. Output signal points from encoder 106 are provided to a modulator 108, which modulates the signal points onto a communication channel 110 for transmission to the receiver portion of the communication system.

Encoder 106 includes a differential encoder 112 (which is later also referred to as being a Mod-4, Mod-8, or Mod-16 differential encoder) that receives input bits to be encoded for transmission on channel 110. Encoder 106 also includes a trellis encoder 114, a block encoder 116, and a 2N-dimensional constellation mapper 118 (where N is a positive integer).

As further described below, a 2N-dimensional constellation is partitioned into a first group of trellis subsets, each of which is in turn partitioned into a number of block subsets. The partitioning is performed such that the intra-subset minimum squared Euclidian distance (MSED) of each trellis subset is greater than that of the overall constellation. The intra-subset MSED of each block subset, in turn, is greater than that of each trellis subset. The partitioning is performed in a novel way, as described below, such that rotational invariance is achieved.

Differential encoder 112 receives from serial-to-parallel converter 104 $m_1+m_2+m_3$ bits (the same bits are shown at the output of data source 101) per group of N 2D signaling intervals (per 2N-dimensional signaling interval). Differential encoder 112, the operation of which will be discussed below, operates to eliminate the effect of the phase ambiguity of the constellation. The output of differential encoder 112 is divided into three rails having $m_1$, $m_2$, and $m_3$ bits, respectively. (Although all of the bits input to encoder 106 are shown as passing through differential encoder 112, only selected ones of the input bits are actually processed by the differential encoder. This is described in greater detail in the embodiments discussed below.) The bits on the first rail enter trellis encoder 114 to become $m_1+r_1$ output bits, which are used in trellis subset selector 120 of constellation mapper 118 to select a trellis subset $U_n$, where the subscript n denotes the present 2N-dimensional signaling interval. The $m_2$ bits on the second rail enter block encoder 116 whose $m_2+r_2$ output bits further select from trellis subset $U_n$ a block subset $V_n$ in block subset selector 122 of constellation mapper 118. The remaining $m_3$ bits on the third rail output from differential encoder 112 remain uncoded and are received by a signal point selector 124 of constellation mapper 118 to select a 2N-dimensional signal point $Q_n$ from the selected block subset $V_n$. The selected 2N-dimensional signal point is then processed in a conventional manner by a pulse shaping filter (not shown) and modulator 108 for transmission on channel 110. This scheme is referred to as being "multilevel" because several bits are encoded by trellis encoder 114 while other bits not encoded by the trellis encoder are encoded by block encoder 116.

FIG. 2 shows the receiver portion of the communication system. The signal received from channel 110 is first processed by equalizer/demodulator 200. The output of equalizer/demodulator 200, $\tilde{Q}_n$, is a channel-impaired 2N-dimensional signal point that is provided to decoder 202 (described in detail below) for decoding in accordance with the invention. The decoded signal is output to a parallel-to-serial converter 204, descrambled in a conventional manner by a descrambler 206, and received by a data sink 208.

Decoder 202 includes a trellis decoder 210, a block decoder 212, and a differential decoder 214. Channel-impaired 2N-dimensional signal point $\tilde{Q}_n$ first enters trellis decoder 210. Trellis decoder 210 can be implemented as a conventional Viterbi decoder of the type used for decoding trellis coded bits in system where the bits not trellis encoded are simply left uncoded. Trellis decoder 210 outputs, on line 216 in the present 2N-dimensional signaling interval n, an estimated trellis subset $\hat{U}_{n-l}$ that correspond to the trellis subset $U_{n-l}$ that was selected by trellis subset selector 120 in an earlier 2N-dimensional signaling interval n–l. The trellis subset $\hat{U}_{n-l}$ is provided via line 216 to block decoder 212. Trellis decoder 210 also outputs the received signal point $\tilde{Q}_{n-l}$ to block decoder 212 via lines 218.

Block decoder 212 preferably is implemented as a conventional Viterbi decoder. Block decoder 212 identifies a signal point $\hat{Q}_{n-l}$ (after some delay) from a block subset of the trellis subset $\hat{U}_{n-l}$ identified by trellis decoder 210 on line 216, as described in greater detail below. Block decoder 212 outputs, via lines 220, 222, and 224, the $m_1$, $m_2$, and $m_3$ bits corresponding to $\hat{Q}_{n-l}$, as specified by encoder 106. Differential decoder 214 then decodes the three groups of input bits $m_1+m_2+m_3$ and provides the output bits to parallel-to-serial converter 204.

Figure 3:
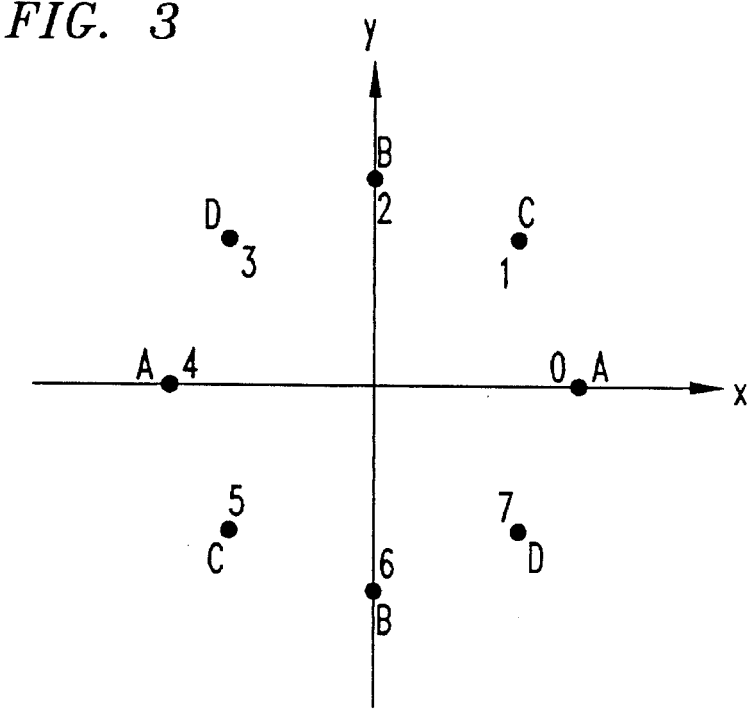
FIG. 3 is a two-dimensional (2D) 8-PSK constellation that may be used in the transmitter of FIG. 1.

FIG. 3 shows a 2-dimensional (2D) 8-PSK constellation having eight 2D signal points ("symbols") labeled 0–7. The eight symbols are partitioned into four subsets A, B, C, and D, each subset having two symbols. Subset A includes symbols 0 and 4, subset B includes symbols 2 and 6, and so on.

A 32-point 4D 8-PSK constellation is then formed by first concatenating a pair of 2D 8-PSK constellation and then deleting 32 selected points. The deleted points are those whose first symbol is even numbered and second symbol is odd numbered, and those whose first symbol is odd numbered and second symbol is even numbered.

Figure 4:
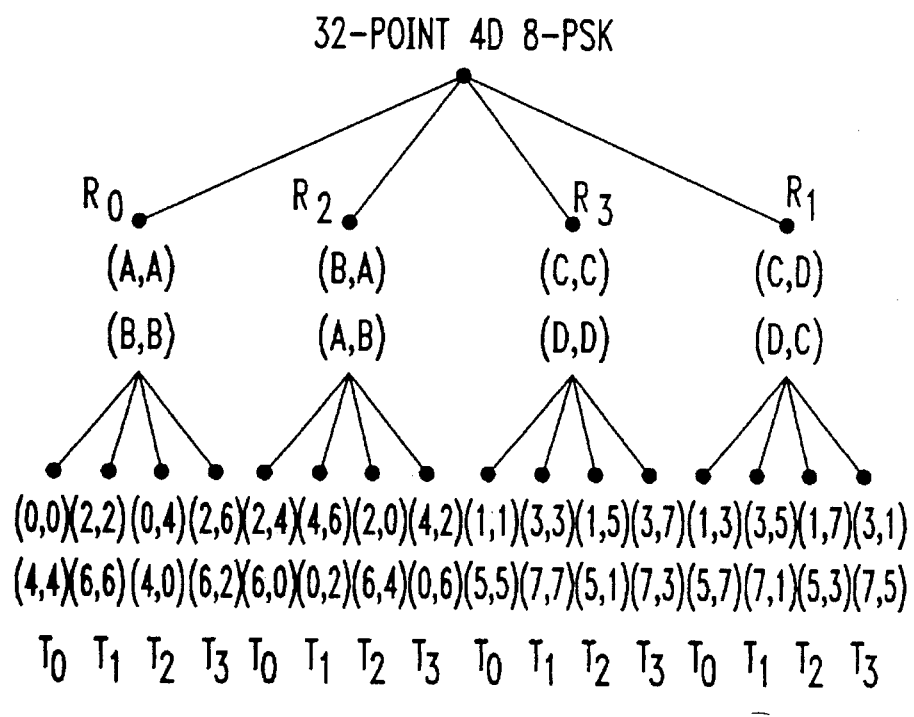
FIG. 4 shows how a four-dimensional (4D) 8-PSK constellation used in the illustrative embodiment is partitioned into subsets.

FIG. 4 shows how to partition this 4D 8-PSK constellation into subsets. The constellation is first partitioned into four trellis subsets, $R_0$, $R_1$, $R_2$, and $R_3$. Each trellis subset consists of two concatenations of two 2D subsets of FIG. 3. For example, subset $R_0$ consists of (A,A) and (B,B), while subset $R_2$ consists of (B,A) and (A,B). Each trellis subset is further partitioned into four block subsets, $T_0$, $T_1$, $T_2$, and $T_3$. The intra-subset MSED of the 4D constellation illustratively has a value of 1.17, if the amplitude of each symbol of the 2D 8-PSK constellation is normalized to one. Each of the trellis subsets has an intra-subset MSED of 4 of each of the block subsets has an intra-subset MSED of 8.

The above partitioning has the following properties. Each trellis subset $R_i$ is invariant to 90, 180, or 270 degree rotation. That is, following a rotation of the constellation corresponding to a phase ambiguity of the constellation, a valid trellis subset will become another valid trellis subset.

Each block subset $T_j$ is invariant to only 180 degree rotation. Moreover, when a $T_j$ of an $R_i$ is rotated by 45, 135, 225, or 315 degrees, $T_j$ sometimes becomes $T_j$ of a different $R_i$ and sometimes becomes $T_{j'}$, with j' being not equal to j, of a different $R_i$. For example, referring to FIG. 4, after a 45 degree rotation, $T_0$ of $R_0$ becomes $T_0$ of $R_3$, but $T_0$ of $R_2$ becomes $T_1$ of $R_1$. As will become clear later, the existence of these properties of the block subset $T_j$ poses a problem in designing rotationally invariant multilevel coded systems based directly on the 4D constellation of FIG. 4.

Figure 5:
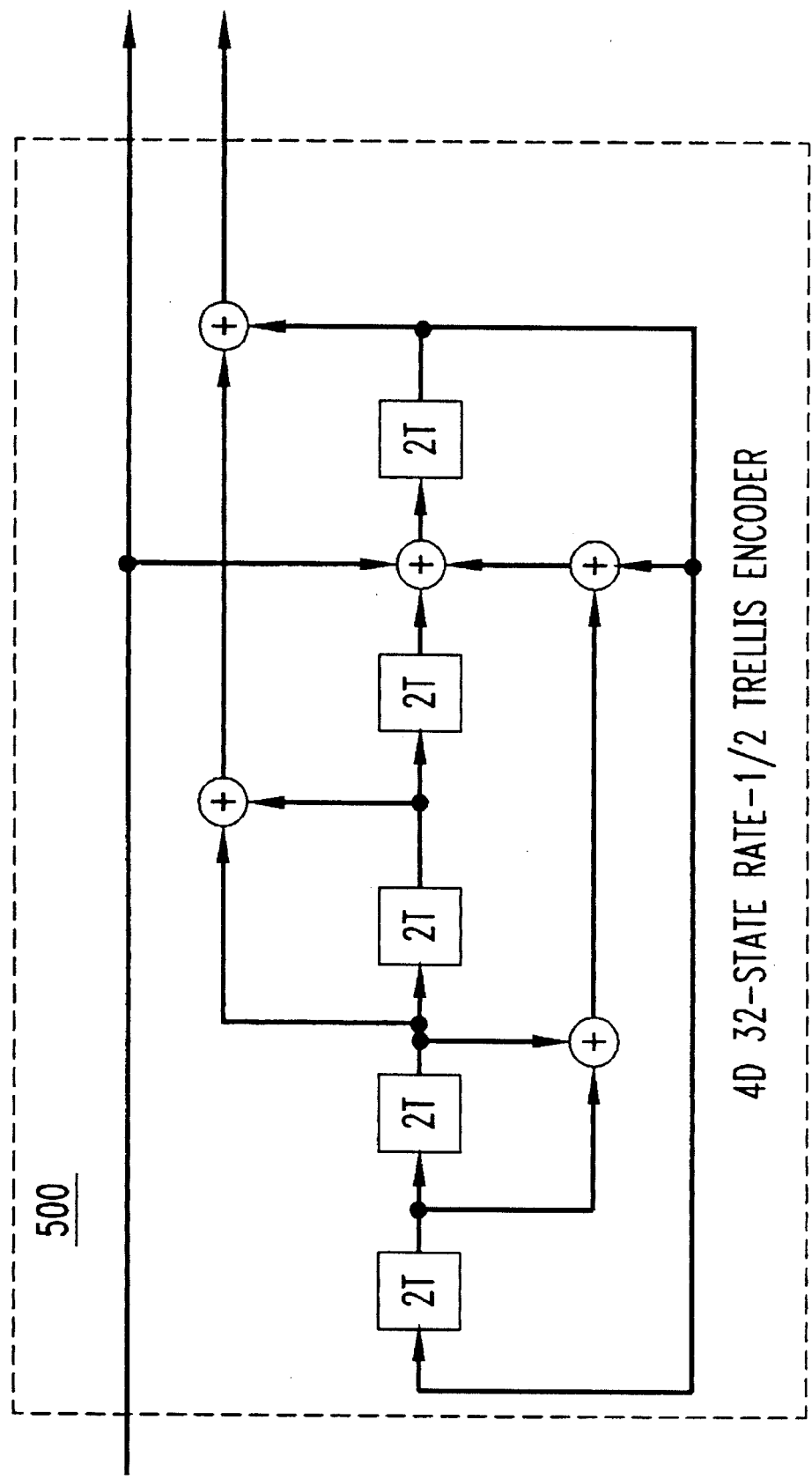
FIG. 5 is a schematic diagram of an illustrative embodiment of the trellis encoder of the transmitter of FIG. 1.

Using the four subset partition of the 4D constellation of FIG. 4, an exemplary 4D 32-state rate ½ trellis encoder 500 can be constructed as shown in FIG. 5. Trellis encoder 500 receives one bit per 4D signaling interval and generates two output bits which are used to select a trellis subset $R_i$, whose subscript i is the decimal equivalent of the two trellis output bits (reading from top to bottom). Trellis encoder 500 includes five identical delay elements which are interconnected to one another by exclusive-or gates (designated by the symbol "+"). Each of the delay elements represents a 2T delay, where T is a 2D signal interval. Trellis encoder 500 is constructed to be rotationally invariant, in accordance with the principles described in L.F. Wei, "Rotationally Invariant Trellis-Coded Modulations with Multidimensional M-PSK," IEEE Journal on Selected Areas in Communications, Vol 7, No. 9, Dec. 1989, pp. 1281–95, which is hereby incorporated by reference. Trellis encoder 500 also is designed to maximize the trellis distance as taught in commonly owned, copending U.S. patent application Ser. No. 07/869,985, filed Apr. 16, 1992 entitled "Multilevel Coding Using Trellis-Coded Modulation and Reed-Solomon Codes," which is hereby incorporated by reference. As used herein, the trellis distance is the MSED between any two different valid sequences of trellis subsets identified by the trellis encoder.

If rotational invariance is not critical, then the 4D 32-state rate ½ trellis encoder described above can be used as trellis encoder 114 of FIG. 1. In this case, a so-called double parity check (DPC) code, described in detail below, can be used to implement block encoder 116. The DPC generates two output bits per 4D signaling interval, which are used to select a block subset $T_j$ of the trellis subset $R_i$ that was previously selected by the trellis encoded bits. However, using the approach just described, it is extremely difficult to achieve rotational invariance. This difficulty arises because of the rotationally variant propertie of the block subset $T_j$ described above.

I have discovered that rotational invariance can be achieved, in accordance with the invention, by first converting the 4D 32-state rate-½ trellis code of FIG. 4 into a code of higher dimensionality (in this case, an 8D code), and partitioning the corresponding higher dimensional constellation in such a way that its trellis subsets and block subsets are invariant to the same 90, 180, and 270 degree rotations.

Figure 6:
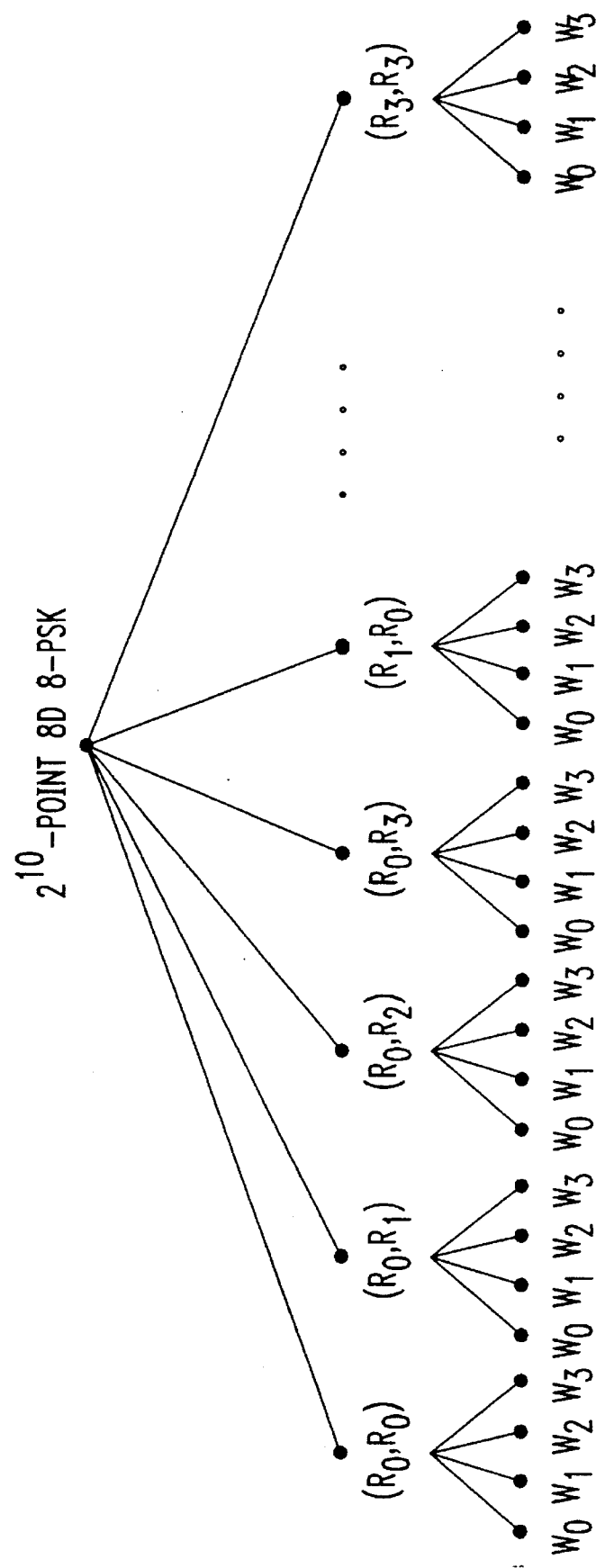
FIG. 6 shows how an eight-dimensional (8D) 8-PSK constellation used in the illustrative embodiment is partitioned into subsets.

FIG. 6 shows a $2^{10}$-point 8D 8-PSK constellation formed by concatenating a pair of the 32-point 4D 8-PSK constellations of FIG. 4. This 8D constellation is partitioned into sixteen 8D trellis subsets $(R_i,R_j)$, each being a concatenation of 4D trellis subsets $R_i$ and $R_j$ of FIG. 4. Each 8D trellis subset $(R_i,R_j)$ is further partitioned into four block subsets $W_0$, $W_1$, $W_2$ and $W_3$. Depending upon the values of i and j, the four block subsets of an 8D trellis subset is formed as shown in FIG. 7.

Figure 7:
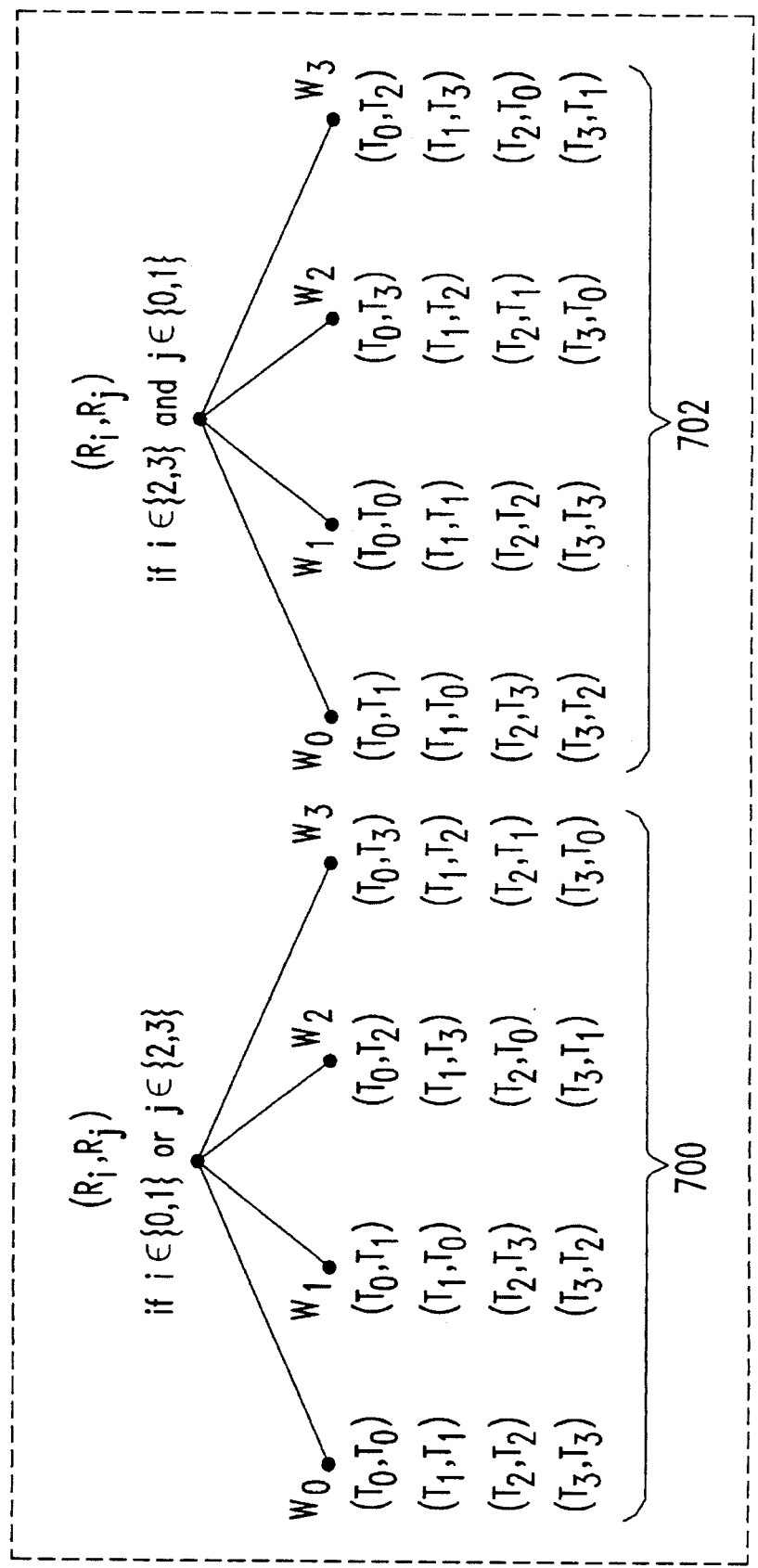
FIG. 7 shows how the block subsets of FIG. 6 are formed.

Referring to FIG. 7, each 8D block subset $W_q$ of $(R_i,R_j)$ consists of the union of four concatenations of 4D block subsets $(T_p,T_q)$, where $T_p$ and $T_q$ are subsets of $R_i$ and $R_j$, respectively. Subset $W_q$ of subset $(R_i,R_j)$ is constructed as shown in the grouping labeled reference number 700 if i belongs to {0,1} or j belongs to {2,3}. Otherwise, the subset $(R_i,R_j)$ is constructed as shown in the grouping labeled reference number 702. (The reason for using two different construction rules will be made clear below.) The 8D constellation of FIG. 6 has an intra-subset MSED of 1.17, its trellis subsets $(R_i,R_j)$ have an intra-subset MSED of 4, and its block subsets $W_q$ have an intra-subset MSED of 8.

The above partitioning of FIGS. 6 and 7 have the following additional desirable properties. First, in contrast to the partitioning of the 4D constellation of FIG. 4, each block subset $W_q$ is invariant to 90, 180, and 270 degree rotations. Second, for each $W_q$ of an $(R_i,R_j)$, after any 45, 135, 225, and 315 degree rotation, $W_q$ becomes $W_q$ of a different $(R_i,R_j)$. For example, $W_0$ of $(R_0, R_1)$ becomes $W_0$ of $(R_3, R_2)$ after a 45, 135, 225, or 315 degree rotation. As another example, $W_0$ of $(R_0, R_2)$ becomes $W_0$ of $(R_3, R_1)$ after a 45, 135, 225, or 315 degree rotation. Had we not used two sets of rules as shown in FIG. 7 for partitioning 8D trellis subsets $(R_i,R_j)$, the second property described above would not be valid for some block subsets. These properties are advantageously used, in accordance with the invention, to design the rotationally invariant, multi-level codes described below.

Figure 8:
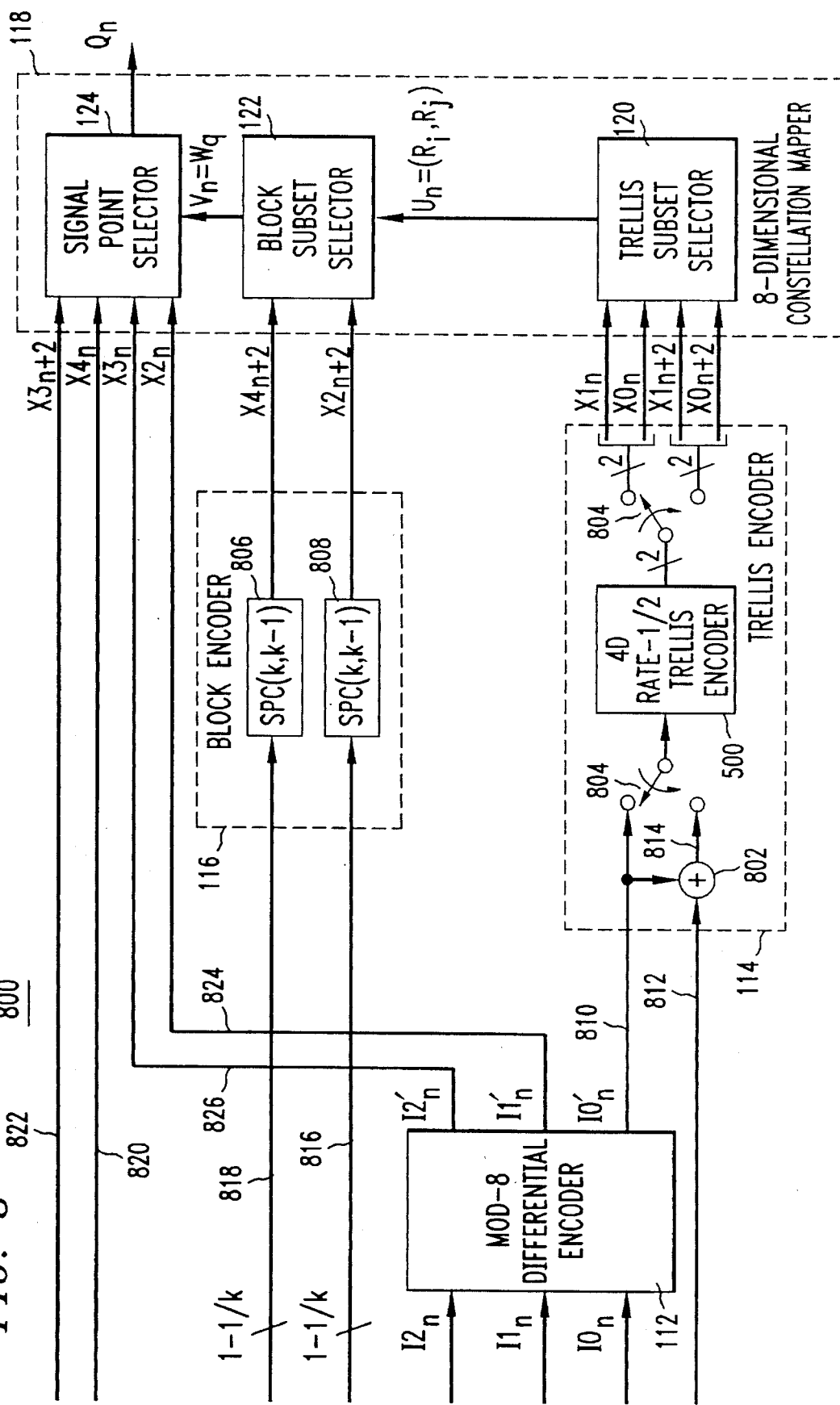
FIG. 8 is a block diagram of an illustrative embodiment of the encoder of FIG. 1 for use with the constellation of FIG. 6.

FIG. 8 shows how the 4D 32-state rate-½ trellis encoder of FIG. 5 is converted into an 8D trellis encoder. FIG. 8 also shows an exemplary encoder 800, for implementing encoder 106 of FIG. 1, that is based on the converted 4D trellis code. Encoder 800 includes a Mod-8 differential encoder 112; trellis encoder 114 having a 4D 32-state rate-½ trellis encoder 500, an exclusive-or gate 802, and switching circuitry 804; block encoder 116 is a double parity check (DPC) encoder having two single parity check encoders SPC(k, k–1) 806 and 808; and an 8D constellation mapper 118. Constellation mapper 118 includes trellis subset selector 120, block subset selector 122, and point selector 124.

Encoder 800 typically receives eight input bits per 8D signaling interval. However, in one out of every k 8D signaling intervals, encoder 800 receives only six input bits. In this interval, block encoder 116 does not receive any input bits. This is why the average number of bits input to a SPC(k, k–1) in each 8D signaling interval is only 1–1/k.

Three of the eight bits are provided at the inputs to Mod-8 differential encoder 112. The three input bits to the differential encoder in the present 8D signaling interval are denoted as $I2_n$, $I1_n$, and $I0_n$. The three bits output from the differential encoder in the present 8D signaling interval are denoted as $I2_n'$, $I1_n'$, and $I0_n'$. The function of Mod-8 differential encoder 112 is given by the equation $I2_n'I1_n'I0_n' = (I2_{n-4}'I1_{n-4}'I0_{n-4}' + I2_n I1_n I0_n) \mod 1000_{base\ 2}$, where n–4 denotes the previous 8D signaling interval.

One of the three bits output from Mod-8 differential encoder 112 is provided to 8D trellis encoder 114 via line 810. Trellis encoder 114 receives another one of the eight input bits to encoder 800 on line 812. In order to maintain rotational invariance of trellis encoder 114, the bit received on line 812 is "Exclusive-ORed" in gate 802 with the differentially encoded bit on line 810. The 4D 32-state rate-½ trellis encoder 500 of trellis encoder 114 then receives the data bit on line 810 and outputs bits $X1_n$ and $X0_n$, which are used to specify a first 4D trellis subset $R_i$. Trellis encoder 500 receives the second bit on line 814 and outputs bits $X1_{n+2}$ and $X0_{n+2}$, which are used to specify a second 4D trellis subset $R_j$. Together, the four bits $X1_n$, $X0_n$, $X1_{n+2}$ and $X0_{n+2}$ output from trellis encoder 114 identify an 8D trellis subset $(R_i,R_j)$. One skilled in the art will appreciate that the novel trellis encoding arrangement described above will ensure that a valid sequence of trellis subsets will become another valid sequence upon a rotation of the constellation, and that the input bits associated with a valid sequence can be recovered by the receiver irrespective of the rotation.

Two of the remaining four input bits received in each 8D interval by encoder 800 are input to block encoder 116. It is important to note that these two bits are not differentially encoded. As mentioned above, block encoder 116 is a DPC encoder that consists of two SPC encoders 806 and 808. The SPC code has a frame length of k bits, where k illustratively has a value equal to four. For each of the first k−1 8D signal intervals in a frame of k 8D signal intervals, each SPC encoder receives one input bit and passes that bit to the output. In the kth 8D signal interval of that frame, the SPC encoder does not receive any input bit, but outputs a redundant bit whose value is equal to the exclusive OR of the previous k−1 input bits received during that frame. The two bits output from block encoder 116 are provided to block subset selector 122 for selecting a block subset $W_q$ of trellis subset $(R_i, R_j)$, where q is the decimal equivalent of the two bits (reading from top to bottom). Note that the selection of the block subsets here is done such that for two different groups of encoded bits output from the trellis encoder and for the same group of encoded bits output from the block encoder, the two corresponding selected block subsets are related to (i.e., be can be obtained) from each other through a phase rotation of the constellation.

Figure 9:
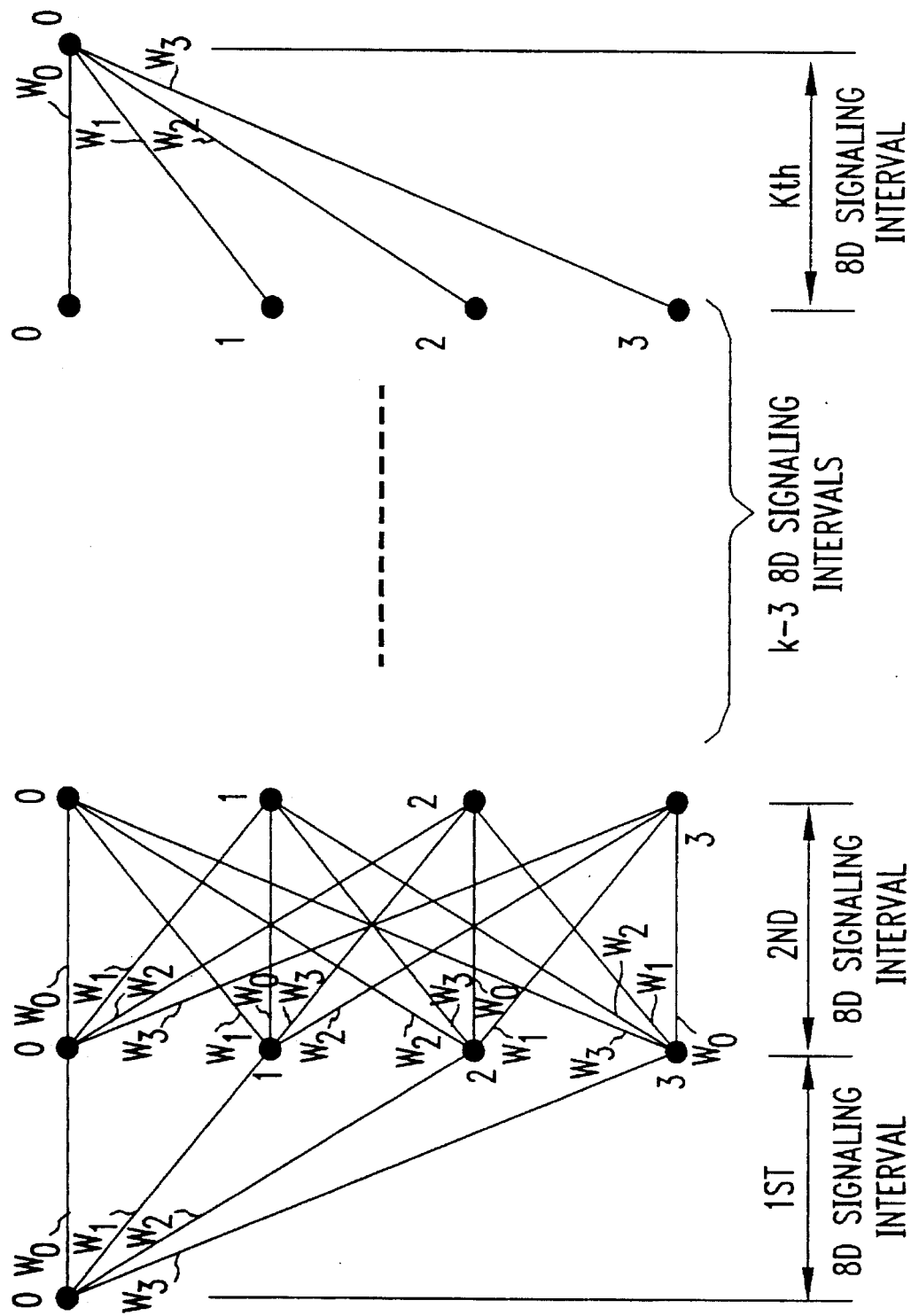
FIG. 9 is a state transition diagram implemented by the block encoder of FIG. 8.

The operation of block encoder 116 in selecting a block subset $W_q$ also can be understood from the state diagram of FIG. 9. At the beginning of a frame, block encoder 116 is at a present state 0. Depending on the value of the two input bits received in the first 8D interval of that frame, block encoder 116 will go to one of the four possible next states 0, 1, 2, and 3 and will output a corresponding one of the four block subsets $W_0$, $W_1$, $W_2$, and $W_3$ of the trellis subset $(R_i, R_j)$ identified by trellis subset selector 120. During the second 8D interval of that frame, depending on the input values of the two input bits and the present state in that interval, block encoder 116 will again go to one of the four possible next states and output another corresponding one of the four block subsets. This process is repeated for the following k−3 intervals. In the last kth interval of the frame, there are no bits input to block encoder 116. In this case, block encoder 116 will go to a next state (which turns out to be always state 0) determined by the values of the two redundant bits and the then present state, and will output a corresponding block subset.

The operation of the state diagram of FIG. 9 can be illustrated with the following example. If the value of the two bits received in the first 8D interval are 01, block encoder 116 will go from present state 0 to next state 1 and will output 8D block subset $W_1$. In the second 8D interval, if the values of the two input bits are 10, block encoder 116 will go from the then present state 1 to next state 3 and will output the corresponding 8D block subset $W_2$, and so on.

The same state diagram of FIG. 9 will be used by block decoder 212 (FIG. 2) to decode received signal points. Because of the properties of the block subsets $W_q$ described earlier, a valid sequence of block subsets will remain a valid sequence after a rotation of the constellation. In fact, the path through the state diagram that represents a valid sequence of block subsets, and its rotated version, are identical in this case. This results from using two different construction rules, as shown in FIG. 7, for partitioning the trellis subsets into block subsets.

Referring again to FIG. 8, the two remaining bits on lines 820 and 822, and the two differentially encoded bits on lines 824 and 826, in each 8D signaling interval are provided to point selector 124 of constellation mapper 118 to select an 8D signal point $Q_n = (P_n, P_{n+1}, P_{n+2}, P_{n+3})$ from the selected block subset $W_q$, where $P_n, P_{n+1}, P_{n+2}, P_{n+3}$ are symbols of the 2D 8-PSK constellation of FIG. 3.

It is to be understood that, in this embodiment, the number of bits identified as $m_1$, $m_2$, and $m_3$ in FIG. 1 are 2, 2-2/k, and 4, respectively, for each 8D signaling interval.

Figure 10:
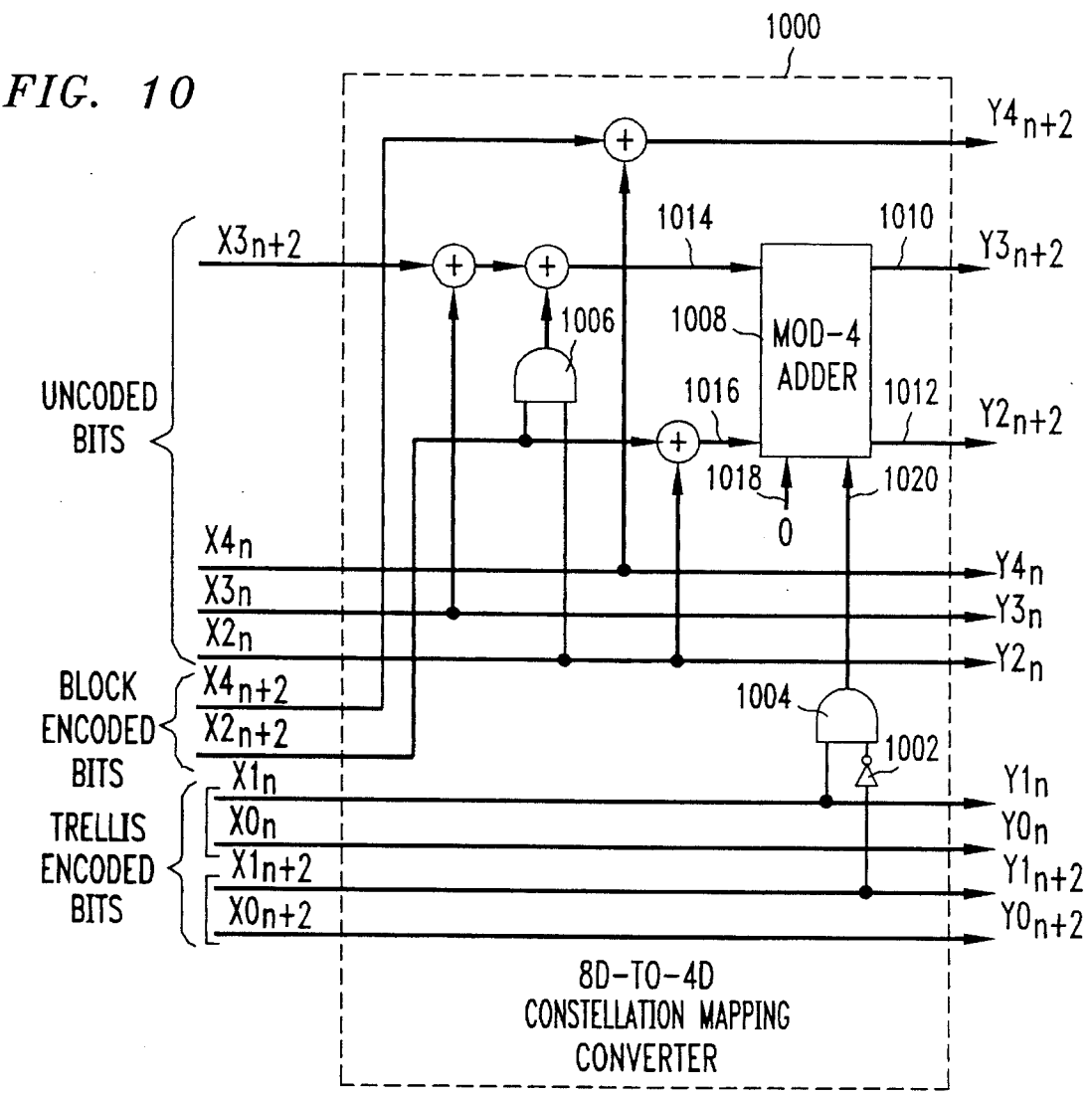
FIG. 10 is a schematic diagram of an 8D-to-4D constellation mapping converter for use in the constellation mapper of FIG. 8.

To maintain rotational invariance, the signal points of subset $W_q$ must be selected such that a valid sequence of signal points remains valid following a rotation of the constellation. FIG. 10 shows the first part of an exemplary embodiment of circuitry for performing such a point selection, together with the trellis subset selector 120 and block subset selector 122. In this part, the 8D constellation mapping is converted into a pair of 4D constellation mappings.

In FIG. 10, a 8D-to-4D constellation mapping converter 1000 is shown which includes an inverter 1002, AND gates 1004 and 1006, a Mod-4 adder 1008, and exclusive-or gates (denoted by "+"). The value of the output bits of adder 1008 on lines 1010 and 1012 (reading from top to bottom) is equal to the mod-4 sum of the value of the input bits on lines 1014 and 1016 (reading from top to bottom), and the value of the input bits on lines 1018 and 1020 (reading from left to right).

The output bits of 8D-to-4D constellation mapping converter 1000 will be divided into two groups, $\{Y0_n, Y1_n, Y2_n, Y3_n, Y4_n\}$ and $\{Y0_{n+2}, Y1_{n+2}, Y2_{n+2}, Y4_{n+2}\}$. Each group will be used to select a 4D point $(P_n, P_{n+1})$ or $(P_{n+2}, P_{n+3})$. This selection is done as described below. Bits $Y1_n$ and $Y0_n$ select a 4D point, $(P_n, P_{n+1})$, from the 4D trellis subset $R_i$ according to FIG. 11, where i is the decimal equivalent of the bit pair $Y1_n Y0_n$. Each of the two symbols $P_n$ and $P_{n+1}$ then are rotated by r.90 degrees counterclockwise, where r is the decimal equivalent of $Y3_n Y2_n$. The resulting symbol $P_{n+1}$ then is rotated by $Y4_n$.180 degrees. The second 4D point, $(P_{n+2}, P_{n+3})$, is obtained in the same manner using bits $Y0_{n+2}, Y1_{n+2}, Y2_{n+2}, Y3_{n+2}$, and $Y4_{n+2}$ in place of bits $Y0_n$, $Y1_n, Y2_n, Y3_n$, and $Y4_n$, respectively.

Figure 14:
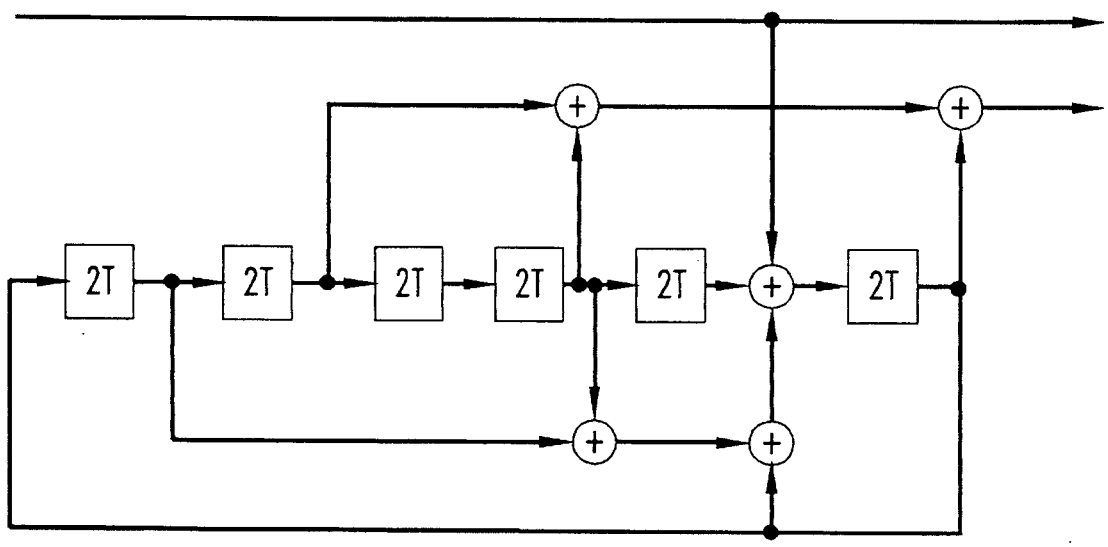

Although the invention has been described thus far in the context of a transmitter which uses a 4D 32-state rate-½ trellis encoder, one skilled in the art will appreciate that other rotationally invariant trellis encoders could be employed. For example, in alternative embodiments of the invention, the 32-state trellis encoder of FIG. 5 could be replaced with the 8-state trellis encoder of FIG. 12 or the 16-state trellis encoder of FIG. 13, in those instances where reduced complexity is more important than performance. On the other hand, where increased performance is desired, the 32-state trellis encoder of FIG. 5 is replaced with the 64-state trellis encoder of FIG. 14.

The operation of decoder 202 of FIG. 2 will now be described in greater detail. Although in the transmitter the trellis code is an 8D code, the 8D code is converted from a 4D code (as described above). In this case, trellis decoder 210 is identical to what is used for decoding the 4D code. The first step performed by trellis decoder 210 is to identify, for each of the four trellis subsets $R_0$ to $R_3$, the closest 4D signal point of the subset to a received 4D signal point and the squared Euclidian distance between the two points. This information (i.e., the signal points and the distances) is then used in a conventional manner by a Viterbi decoder that forms a part of trellis decoder 210. One output of trellis decoder 210 line 216) in the present 8D signal interval n (formed by two 4D intervals) is the estimated 8D trellis subset $\hat{U}_{n-l}$ (formed by two estimated 4D trellis subsets) that corresponds to the 8D trellis subset $U_{n-l}$ selected by the transmitter in an earlier 8D signal interval n−1. The other output of trellis decoder 210 is the delayed received channel-impaired 8D signal point $\tilde{Q}_{n-l}$.

Both outputs from trellis decoder 210 are provided to block decoder 212, which identifies an 8D signal point $\hat{Q}_{n-l}$ from the 8D trellis subset $\hat{U}_{n-l}$. The first step performed by block decoder 212 is to identify, for each of the four block subsets $W_0$ to $W_3$ of the identified trellis subset $\hat{U}_{n-l}$, the closest 8D signal point of the block subset to the received 8D signal point $\tilde{Q}_{n-l}$ and the squared Euclidian distance between the two points. This information is then used in a conventional manner by another Viterbi decoder, which is the second step performed by block decoder 212. This second Viterbi decoder operates according to the state diagram of FIG. 9.

Block decoder 212 outputs to differential decoder 214, via lines 220, 222, and 224, the $m_1$ (=2), $m_2$ (=2-2/k), and $m_3$ (=4) bits corresponding to $\hat{Q}_{n-l}$, as specified by encoder 106. Differential decoder 214 then decodes the three groups of input bits $m_1+m_2+m_3$ and provides the output bits to parallel-to-serial converter 204. Differential decoder 214 is a conventional differential decoder whose operation is the inverse of differential encoder 112.

Figure 15:
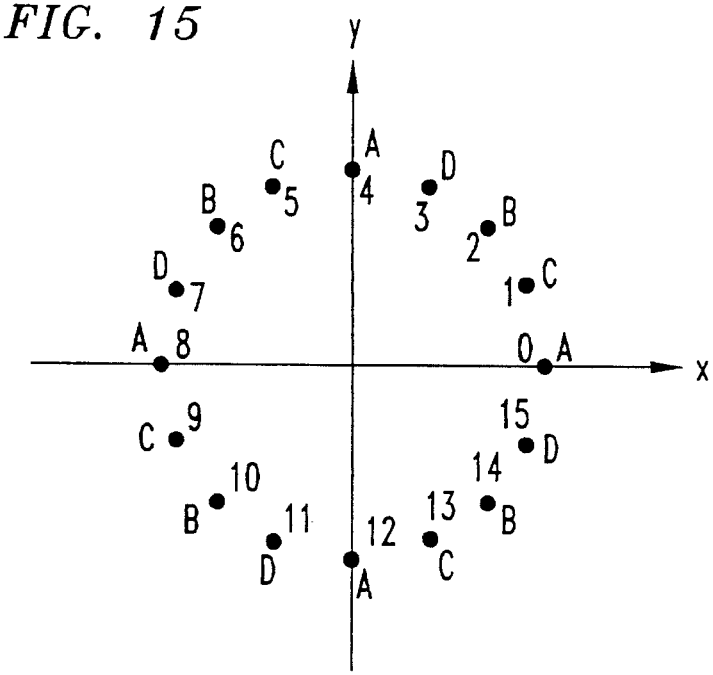
FIG. 15 is a 2D 16-PSK constellation that may be used in the transmitter of FIG. 1.

FIG. 15 shows a 2D 16-PSK constellation having sixteen symbols labeled 0–15. The sixteen symbols are partitioned into four subsets A, B, C, and D, each subset having four symbols. Subset A includes symbols 0, 4, 8, and 12, subset B includes symbols 2, 6, 10, and 14, and so on.

A 128-point 4D 16-PSK constellation is then formed by first concatenating a pair of 2D 16-PSK constellations and then deleting 128 selected points. The deleted points are those whose first symbol is even numbered and second symbol is odd numbered, and those whose first symbol is odd numbered and second symbol is even numbered.

Figure 16:
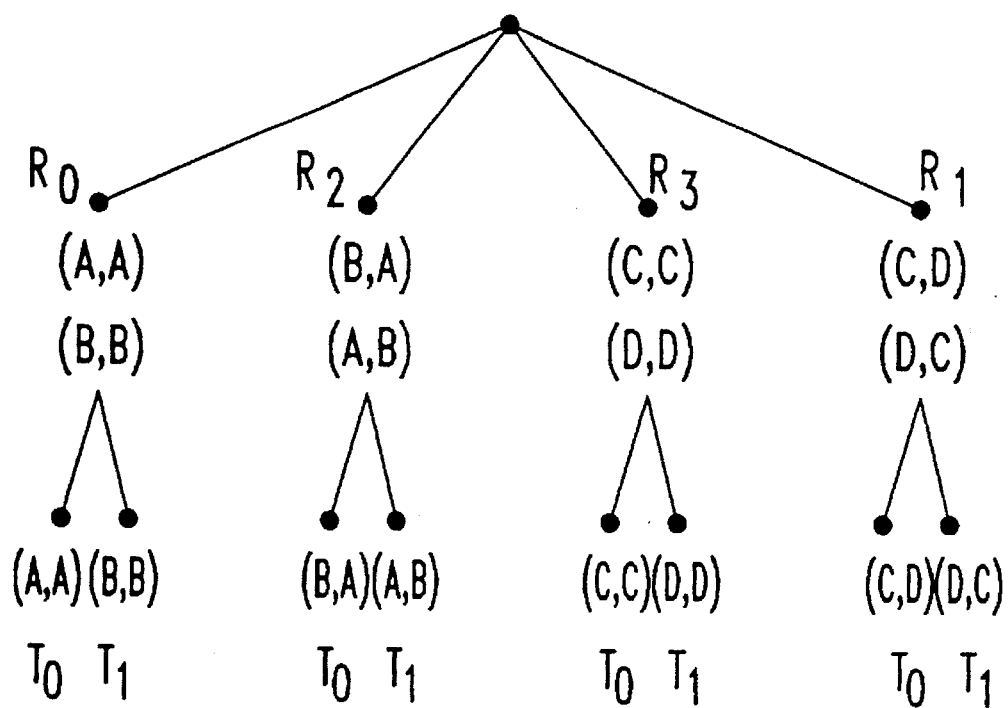
FIG. 16 shows how a 4D 16-PSK constellation is partitioned into subsets.

FIG. 16 shows how to partition this 4D 16-PSK constellation into subsets. The constellation is first partitioned into four trellis subsets, $R_0$, $R_1$, $R_2$, and $R_3$. Each trellis subset consists of two concatenations of two 2D subsets of FIG. 15. For example, subset $R_0$ consists of (A,A) and (B,B), while subset $R_2$ consists of (B,A) and (A,B). Each trellis subset is further partitioned into two block subsets, $T_0$ and $T_1$. The intra-subset MSED of the 4D constellation illustratively has a value of 0.3, if the amplitude of the symbols of the 2D 16-PSK constellation is normalized to one. Each of the trellis subsets has an intra-subset MSED of 1.17 and each of the block subsets has an intra-subset MSED of two.

Each trellis subset $R_i$ is invariant to q.45 degree rotation for q=1, 2, ..., 7. Using the four subset partition of the 4D constellation of FIG. 16, a suitable trellis encoder can be constructed as described above for the 8-PSK case. In fact, the same trellis encoders shown in FIGS. 5 and 12–14 can be used here. Such a trellis encoder will receive one bit per 4D signaling interval to generate two output bits which are used to select a trellis subset $R_i$, whose subscript i is the decimal equivalent of the two trellis output bits (reading from top to bottom). Each block subset $T_j$ is invariant to only 90, 180, and 270 degree rotations. Moreover, when a $T_j$ of an $R_i$ is rotated by 22.5 degrees, $T_j$ sometimes becomes $T_j$ of a different $R_i$ and sometimes becomes $T_{j'}$, with j' being not equal to j, of a different $R_i$.

As previously discussed (with respect to the 8-PSK constellation of FIG. 3), the 4D rate-½ trellis encoder described above can be used directly as trellis encoder 114 of FIG. 1 for the 4D 16-PSK constellation if rotational invariance is not critical. In this case, an SPC code, is used to implement block encoder 116. The SPC generates one output per 4D signaling interval which is used to select a block subset $T_j$ of the trellis subset $R_i$ that was previously selected by the trellis encoded bits. However, using the approach just described, it is difficult to achieve rotational invariance because of the rotationally variant properties of the block subset $T_j$.

Rotational invariance can be achieved, in accordance with the invention, by first converting the 4D trellis code of higher dimensionality (in this case, an 8D code).

Figure 17:
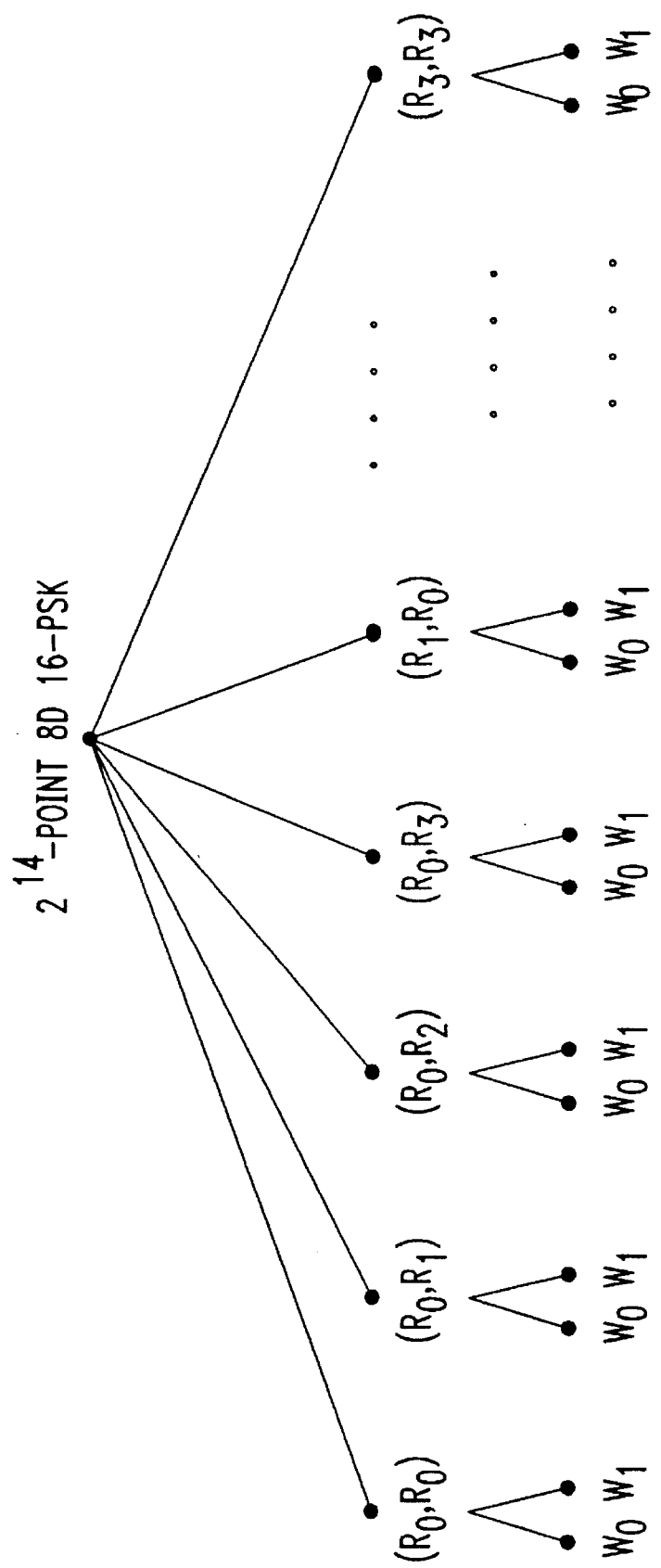
FIG. 17 shows how an 8D 16-PSK constellation is partitioned into subsets.

FIG. 17 shows a $2^{14}$-point 8D 16-PSK constellation formed by concatenating a pair of the 128-point 4D 16-PSK constellations of FIG. 16. This 8D constellation is partitioned into sixteen 8D trellis subsets $(R_i, R_j)$, each being a concatenation of 4D trellis subsets $R_i$ and $R_j$ of FIG. 16. Each 8D trellis subset $(R_i, R_j)$ is further partitioned into two block subsets $W_0$ or $W_1$. Depending upon the values of i and j, the two block subsets of an 8D trellis subset is formed as shown in FIG. 18.

Figure 18:
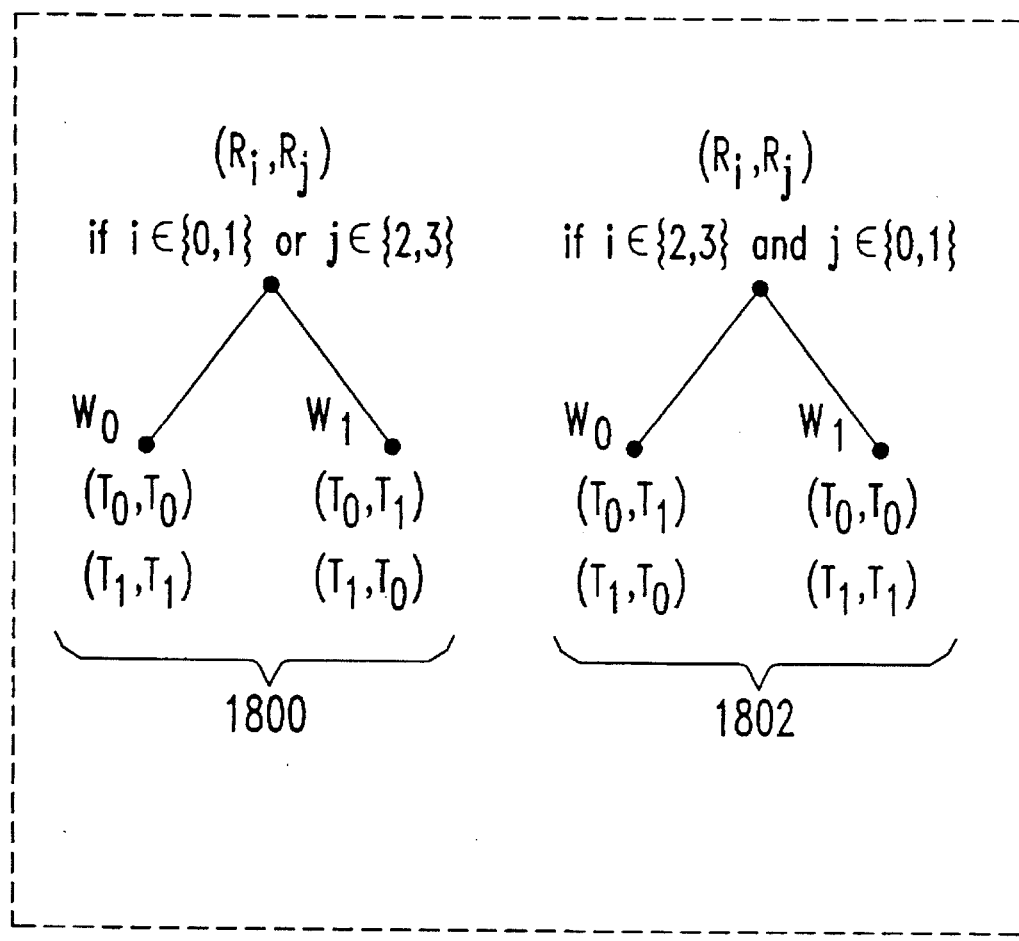
FIG. 18 shows how the block subsets of the constellation of FIG. 17 are formed.

Referring to FIG. 18, each 8D block subset $W_q$ of $(R_i, R_j)$ consists of the union of two concatenations of 4D block subsets $(T_p, T_q)$, where $T_p$ and $T_q$ are subsets of $R_i$ and $R_j$, respectively. Subset $W_q$ of subset $(R_i, R_j)$ is constructed as shown in the grouping labeled reference number 1800 if i belongs to {0,1} or j belongs to {2,3}. Otherwise, the subset $(R_i, R_j)$ is constructed as shown in the grouping labeled reference number 1802. The 8D constellation of FIG. 18 has an intra-subset MSED of 0.3, its trellis subsets $(R_i, R_j)$ have an intra-subset MSED of 1.17, and its block subsets $W_q$ have an intra-subset MSED of 4. In contrast to the partitioning of the 4D constellation of FIG. 16, each block subset $W_q$ is invariant to q.45 degree rotations for q=1, 2, ..., 7. Also, for each $W_q$ of an $(R_i, R_j)$, after any q.45+22.5 degree rotation for q=0, 1, 2, ..., 7, $W_q$ becomes $W_q$ of a different $(R_i, R_j)$.

Figure 19:
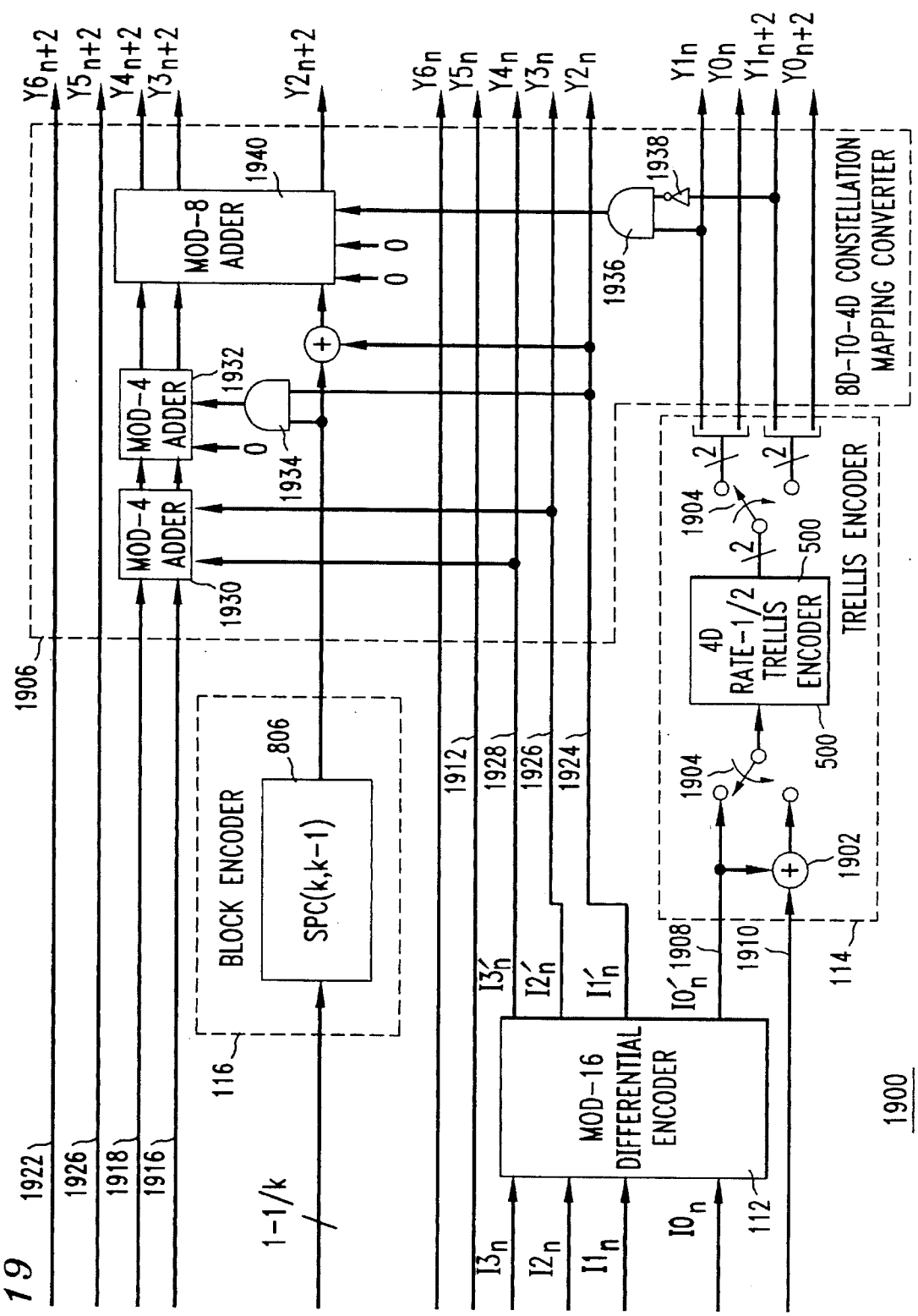
FIG. 19 is a partially schematic diagram of an illustrative embodiment of the encoder of FIG. 1 for use with the constellation of FIG. 17.

FIG. 19 shows an exemplary encoder 1900, for implementing encoder 106 of FIG. 1, that is based on the converted 4D trellis code. Encoder 1900 includes a differential encoder 112 (embodied as a Mod-16 differential encoder); trellis encoder 114 having 4D rate-½ trellis encoder 500 (or alternatively, the trellis encoders of FIGS. 12–14), Exclusive-OR gate 1902, and switching circuitry 1904; block encoder 116 having a SPC (k, k−1) encoder 806. Also shown in FIG. 19 is an 8D-to-4D constellation mapping converter 1906, that provides output bits to a 4D constellation mapper (not shown).

The operation of encoder 1900 is similar to that of encoder 800 of FIG. 8. Encoder 1900 typically receives twelve input bits per 8D signaling interval. However, in one out of every k signaling intervals, encoder 1900 receives only eleven input bits. In this interval, block encoder 116 does not receive any input bits.

Four of the twelve bits are provided at the inputs to Mod-16 differential encoder 112. The four input bits to the Mod-16 differential encoder in the present 8D signaling interval are denoted on FIG. 19 as $I3_n$, $I2_n$, $I1_n$, and $I0_n$. The four bits output from the differential encoder in the present 8D signaling interval are denoted as $I3_n'$, $I2_n'$, $I1_n'$, and $I0_n'$. The function of Mod-16 differential encoder 112 is given by the equation $I3_n'I2_n'I1_n'I0_n' = (I3_{n-4}'I2_{n-4}'I1_{n-4}'I0_{n-4}' + I3_n I2_n I1_n I0_n) \mod 1000_{base\ 2}$, where n−4 denotes the previous 8D signaling interval.

One of the four bits output from Mod-16 differential encoder 112 is provided to 8D trellis encoder 114 via line 1908. Trellis encoder 114 receives another one of the twelve input bits to encoder 1900 on line 1910. In order to maintain rotational invariance of trellis encoder 114, the bit received on line 1910 is Exclusive-ORed in gate 1902 with the differentially encoded bit on line 1908. The 4D 32-state rate-½ trellis encoder 500 of trellis encoder 114 then receives the data bit on line 1908 and outputs bits $Y1_n$ and $Y0_n$, which are used to specify a first 4D trellis subset $R_i$. Trellis encoder 500 receives the second bit on line 1910 and outputs bits $Y1_{n+2}$ and $Y0_{n+2}$, which are used to specify a second 4D trellis subset $R_j$. Together, the four bits $Y1_n$, $Y0_n$, $Y1_{n+2}$ and $Y0_{n+2}$ output from trellis encoder 114 identify an 8D trellis subset $(R_i, R_j)$.

One of the remaining seven input bits received in each 8D interval by encoder 1900 is input to block encoder 116. It is important to note that this bit is not differentially encoded. As mentioned above, block encoder 116 is embodied as SPC 806. The SPC code has a frame length of k bits, where k illustratively has a value equal to four. For each of the first k−1 8D signal intervals in a frame of k 8D signal intervals, SPC encoder 806 receives one input bit and passes that bit to the output. In the kth 8D signal interval of that frame, the SPC encoder does not receive any input bit, but outputs a redundant bit whose value is equal to the exclusive-or of the previous k−1 input bits received during that frame. Thus, SPC encoder 806 receives an average of 1-1/k bits per 8D signaling interval. The bit output from block encoder 116 is provided to 8D-to-4D constellation mapping converter 1906 for use in selecting a block subset $W_q$ of trellis subset (Ri,Rj), where q is the value of the bit output from the block encoder. This selection process is embedded in 8D-to-4D constellation mapping converter 1906 and the subsequent 4D constellation mapper (described below).

Figure 20:
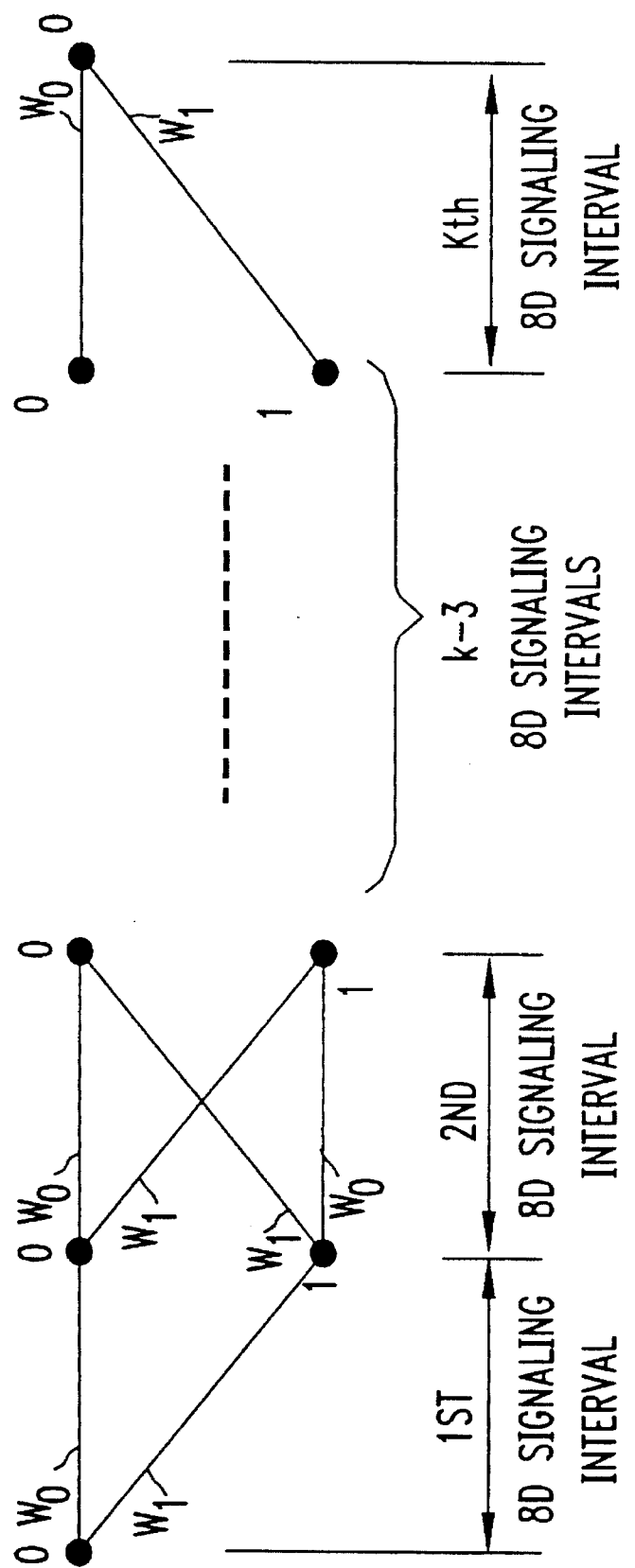
FIG. 20 is a state transition diagram implemented by the block encoder of FIG. 19.

The operation of block encoder 116 in selecting a block subset $W_q$ also can be understood from the state diagram of FIG. 20. (The same state diagram of FIG. 20 will be used by block decoder 212 (FIG. 2) to decode received signal points.) At the beginning of a frame, block encoder 116 is at a present state 0. Depending on the value of the input bit received in the first 8D interval of that frame, block encoder 116 will go to one of the two possible next states 0 and 1, and will output a corresponding one of the two block subsets $W_0$ and $W_1$ of the selected trellis subset $(R_i, R_j)$. During the second 8D interval of that frame, depending on the value of the input bit and the then present state in that interval, block encoder 116 will again go to one of the two possible next states and output another corresponding one of the two block subsets. This process is repeated for the following k−3 intervals. In the last kth interval of the frame, no bit is input to block encoder 116. Instead, block encoder 116 will go to a next state (which turns out always to be state 0) determined by the values of the single redundant bit and the then present state, and will output a corresponding block subset.

Referring again to FIG. 19, the six remaining bits on lines 1912, 1914, 1916, 1918, 1920, and 1922, and the three differentially encoded bits on lines 1924, 1926, and 1928 in each 8D signaling interval are provided to 8D-to-4D constellation mapping converter 1906. Constellation mapping converter 1906 converts the 8D constellation mapping into a pair of 4D constellation mappings. Constellation mapping converter 138 includes Mod-4 adders 1930 and 1932, AND gates 1934 and 1936, inverter 1938, an exclusive-OR gate, and Mod-8 adder 1940, and operates in a manner similar to that described for constellation mapping converter 1000 of FIG. 10.

It is to be understood that, in this embodiment, the number bits identified as $m_1$, $m_2$, and $m_3$ in FIG. 1 are 2, 1-1/k, and 9, respectively, for each 8D signaling interval.

The output bits of constellation mapping converter 1906 will be divided into two groups, $\{Y0_n, Y1_n, Y2_n, Y3_n, Y5_n, Y5_n, Y6_n\}$ and $\{Y0_{n+2}, Y1_{n+2}, Y2_{n+2}, Y3_{n+2}, Y4_{n+2}, Y5_{n+2}, Y6_{n+2}\}$. Each group will be used to select a 4D point, as described below. The two 4D points form an 8D point $Q_n = (P_n, P_{n+1}, P_{n+2}, P_{n+3})$, where $P_n, P_{n+1}, P_{n+2}, P_{n+3}$ are symbols of the 2D 16-PSK constellation of FIG. 15.

The selection of 4D points is done as follows. Bits $Y1_n$ and $Y0_n$ select a 4D point, $(P_n, P_{n+1})$, from the 4D trellis subset $R_i$ according to FIG. 11, where i is the decimal equivalent of the bit pair $Y1_n Y0_n$. Each of symbols $P_n$ and $P_{n+1}$ then are rotated by r.45 degrees counterclockwise, where r is the decimal equivalent of $Y4_n Y3_n Y2_n$. The resulting symbol $P_{n+1}$ then is rotated by s.90 degrees counterclockwise, where s is the decimal equivalent of $Y6_n Y5_n$. The second 4D point, $(P_{n+2}, P_{n+3})$, is obtained in the same manner using bits $Y0_{n+2}, Y1_{n+2}, Y2_{n+2}, Y3_{n+2}, Y4_{n+2}, Y5_{n+2}$, and $Y6_{n+2}$ in place of bits $Y0_n, Y1_n, Y2_n, Y3_n, Y4_n, Y5_n$, and $Y6_n$, respectively. As in the first embodiment, the 8D-to-4D constellation mapping converter and the 4D constellation mapper are constructed such that a valid sequence of signal points remains valid following a q.22.5 degree rotation of the 16-PSK constellation.

One skilled in the art will appreciate that the operations of decoder 202 of FIG. 2 in decoding signals received from encoder 1900 over channel 110 are similar to those described above with respect to the 8-PSK embodiment. Block decoder 212, in this embodiment, uses the state diagram shown in FIG. 20 to perform the decoding operation.

Figure 21:
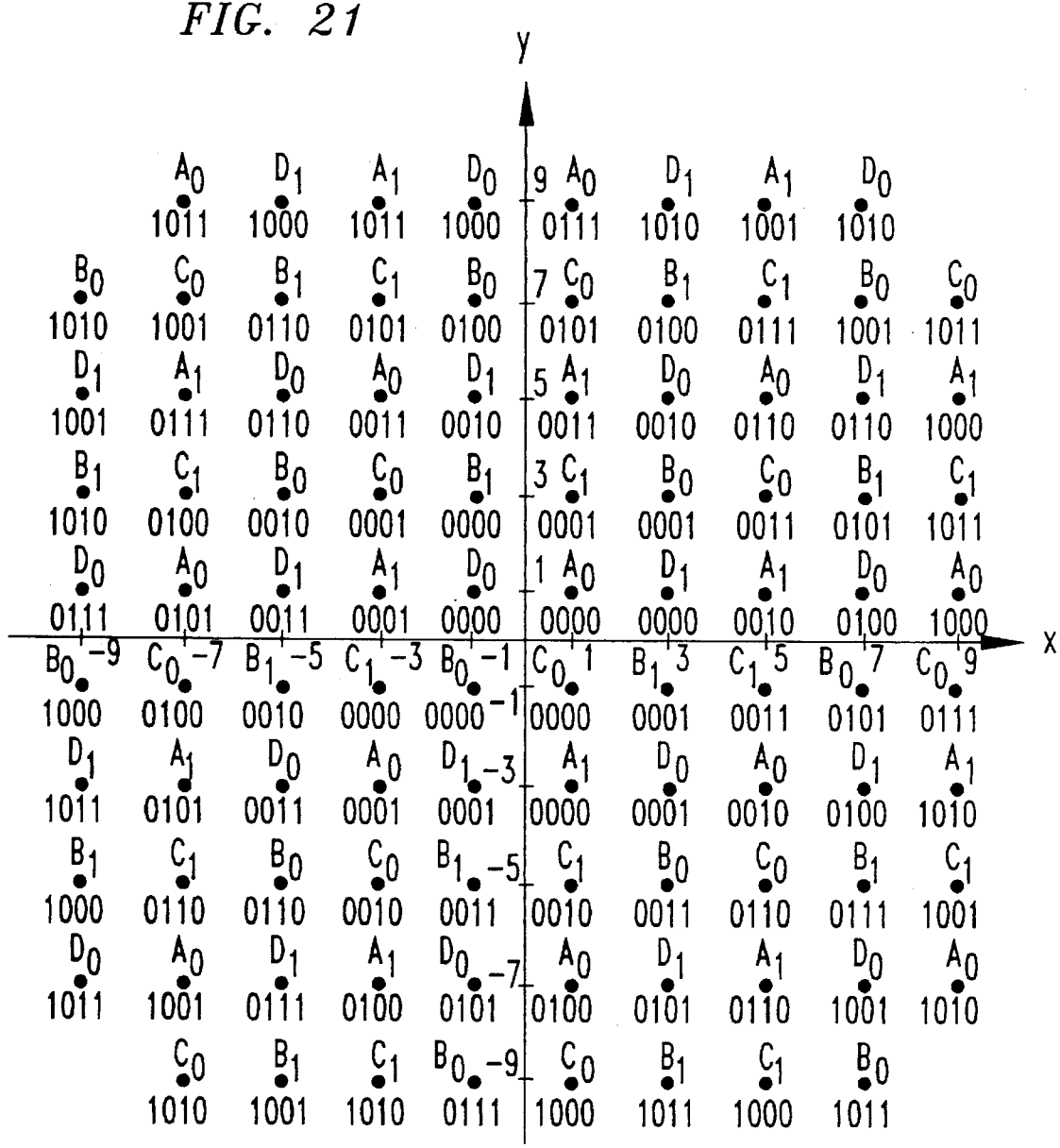
FIG. 21 is a 2D 96-QAM constellation that may be used in the transmitter of FIG. 1.

FIG. 21 shows a 2D QAM constellation having 96 symbols. The symbols are partitioned into four 2D trellis subsets A, B, C, and D. Each trellis subset is further partitioned into two block subsets denoted by a subscript 0 or 1. For example, subset A is partitioned into block subsets $A_0$ and $A_1$. Each 2D symbol in the constellation is uniquely identified by seven bits, $Z6_n, Z5_n, Z4_n, Z3_n, Z2_n, Z1_n$, and $Z0_n$. Bits $Z2_n Z1_n Z0_n$ identify the 2D block subset to which the symbol belongs, as shown in the table of FIG. 22. Bits $Z6_n Z5_n Z4_n Z3_n$ specify the symbol within the block subset.

Figure 23:
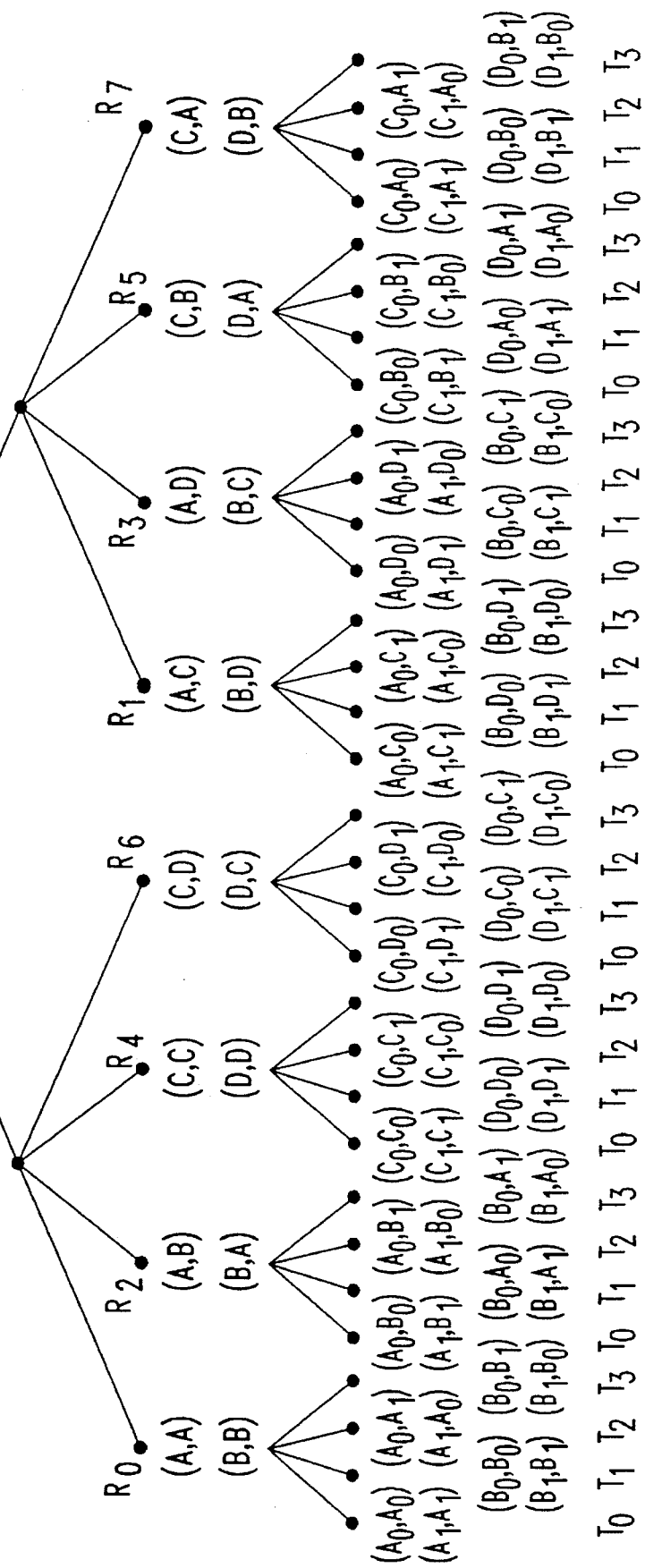
FIG. 23 shows how a 4D 96-QAM constellation is partitioned into subsets.

A $2^{13}$-point 4D 96QAM constellation is then formed by first concatenating a pair of 2D 96-QAM constellations and then deleting selected points. The points to be deleted preferably are selected so as to delete points that require more energy while keeping constellation mapping simple. FIG. 23 shows how to partition this 4D 96-QAM constellation into subsets. The constellation is first partitioned into eight 4D trellis subsets, $R_0$ through $R_7$. Each 4D trellis subset consists of two concatenations of two 2D subsets of FIG. 21. For example, subset $R_0$ consists of (A,A) and (B,B), while subset $R_2$ consists of (A,B) and (B,A). Each 4D trellis subset is further partitioned into four 4D block subsets, $T_0$, $T_1$, $T_2$, and $T_3$. For example, block subset $T_0$ of trellis subset $R_0$ consists of $(A_0, A_0)$ and $(A_1, A_1)$. The intra-subset MSED of the 4D constellation illustratively has a value of 4. Each of the trellis subsets has an intra-subset MSED of 16 and each of the block subsets has an intra-subset MSED of 32.

The above partitioning has the following properties. Each trellis subset $R_i$ is invariant to 180 degree rotation. Each block subset $T_j$ is not invariant to 90, 180, or 270 degree rotations. Moreover, when $T_j$ of an $R_i$ is rotated by 90 degrees clockwise, $T_j$ sometimes become $T_j$ of a different $R_i$ and sometimes becomes $T_{j'}$, with j' being not equal to j, of a different $R_i$. For example, referring to FIG. 23, $T_0$ of $R_0$ becomes $T_0$ of $R_4$ after a 90 degree clockwise rotation, but $T_0$ of $R_5$ becomes $T_1$ of $R_1$. These properties of the block subset $T_j$ poses a problem in designing rotationally invariant multilevel coded systems based directly on the 4D constellation of FIG. 23.

If rotational invariance is not critical, the 4D rate ⅔ trellis encoders described below in FIGS. 27–29, for example, can be used as trellis encoder 114 of FIG. 1. In this case, the DPC code described in detail below, can be used to implement block encoder 116. The DPC generates two output bits per 4D signaling interval, which are used to select a block subset $T_j$ of the trellis subset $R_i$ that was previously selected by the trellis encoded bits. However, using the approach just described, it is extremely difficult to achieve rotational invariance. This difficulty arises because of the rotationally variant properties of the block subset $T_j$ described above.

Figure 27:
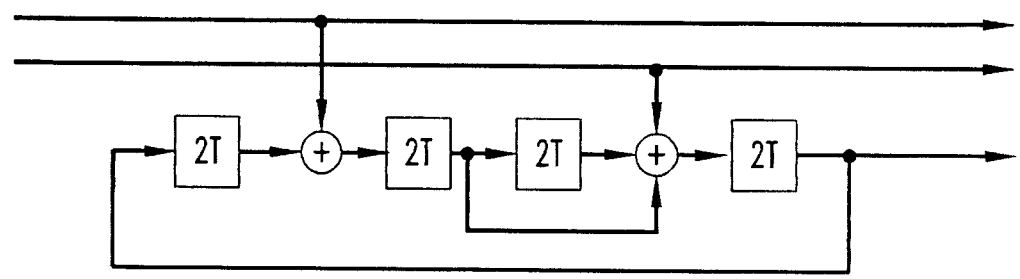
FIGS. 27–29 are block diagrams of illustrative embodiments of trellis encoders suitable for use in the transmitter of FIG. 1.
Figure 28:
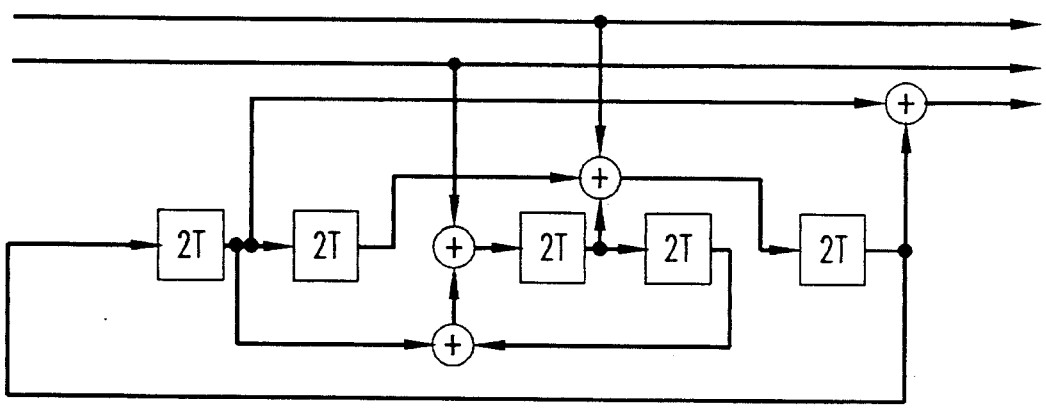
Figure 29:
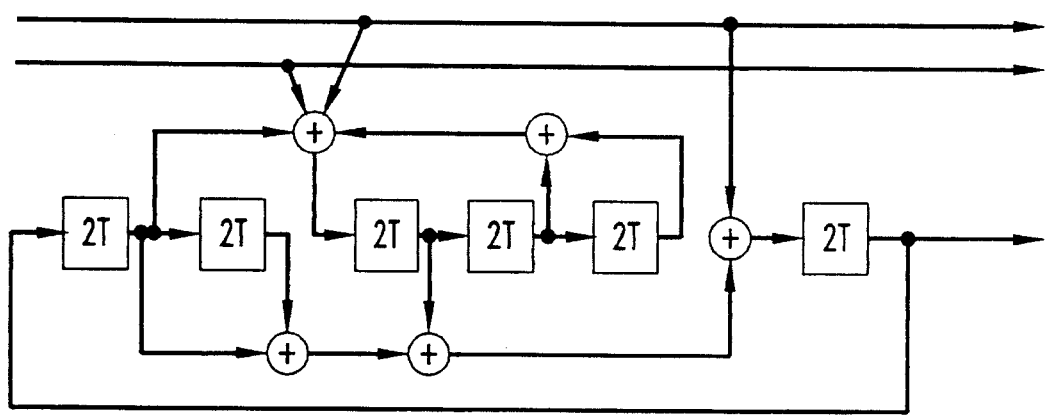

I have discovered that rotational invariance can be achieved, in accordance with the invention, by first converting the 4D rate-⅔ trellis code of FIGS. 27–29 into code of higher dimensionality (in this case, an 8D code). By converting to a code of higher dimensionality, I eliminate any need to differentially encode the bits that are to be block encoded.

Figure 24:
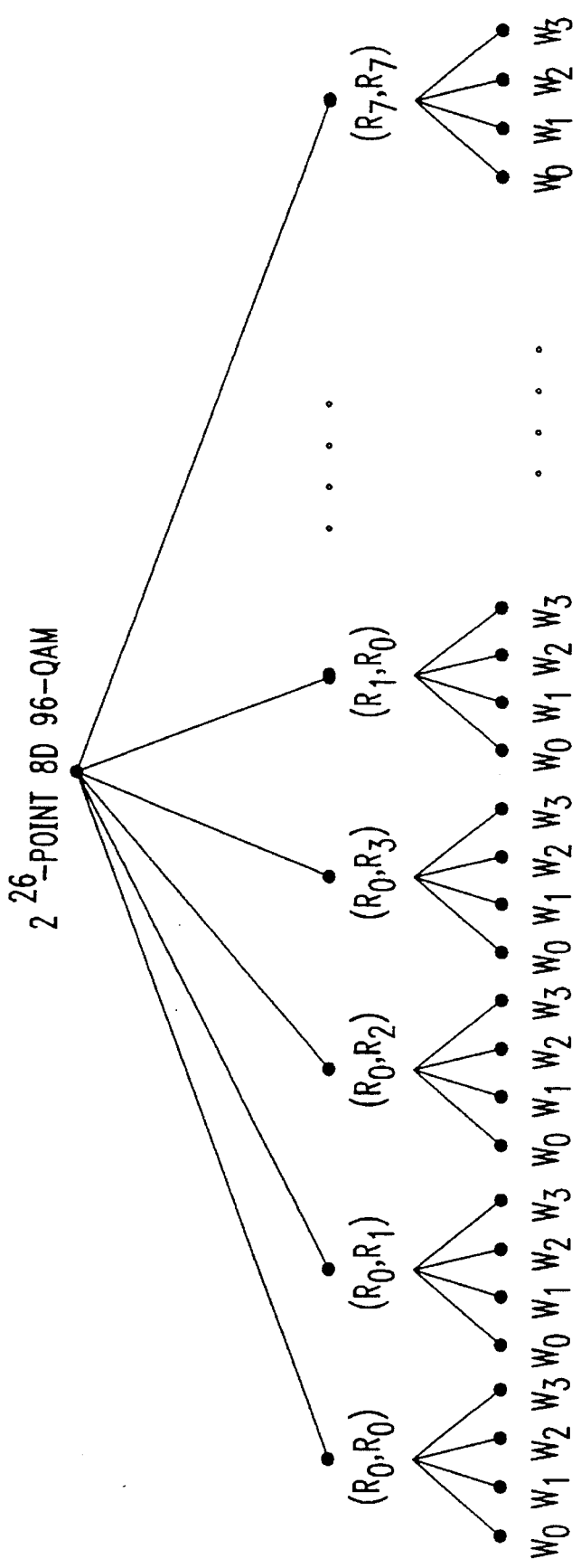
FIG. 24 shows how an 8D 96-QAM constellation is partitioned into subsets.

FIG. 24 shows a $2^{26}$-point 8D 96-QAM constellation formed by concatenating a pair of the $2^{13}$-point 4D 96-QAM constellation of FIG. 23. This 8D constellation is partitioned into 64 8D trellis subsets $(R_i, R_j)$, each being a concatenation of 4D trellis subsets $R_i$ and $R_j$ of FIG. 23. Each 8D trellis subset $(R_i, R_j)$ is further partitioned into four block subsets $W_0$, $W_1$, $W_2$ or $W_3$. Depending upon the values of i and j, the four block subsets of an 8D trellis subset is formed as shown in FIG. 25.

Figure 25:
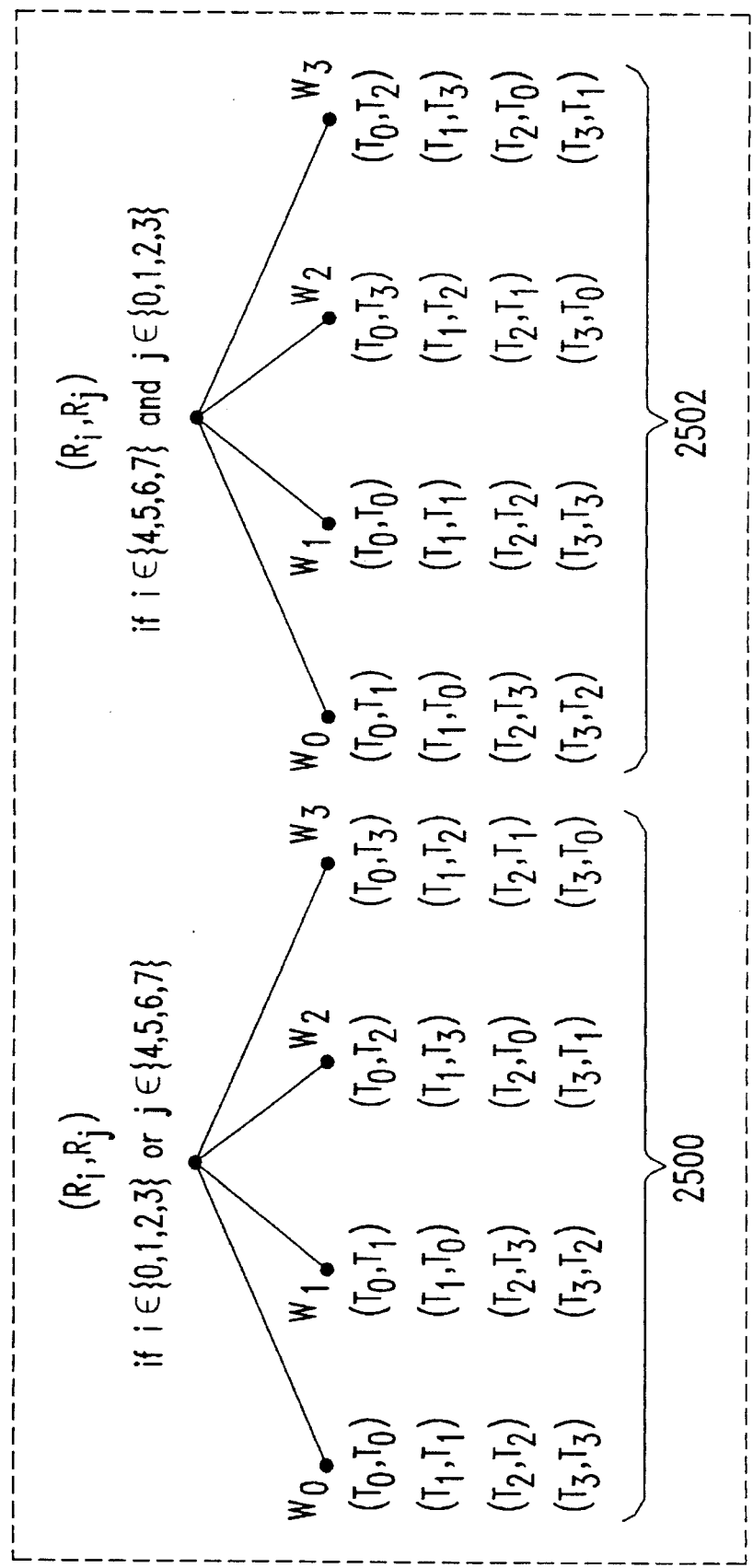
FIG. 25 shows how the block subsets of the constellation of FIG. 24 are formed.

Referring to FIG. 25, each 8D block subset $W_q$ of $(R_i, R_j)$ consists of the union of four concatenations of 4D block subsets $(T_p, T_q)$, where $T_p$ and $T_q$ are subsets of $R_i$ and $R_j$, respectively. Subset $W_q$ of subset $(R_i, R_j)$ is constructed as shown in the grouping labeled reference number 2500 if i belongs to {0,1,2,3} or j belongs to {4,5,6,7}. Otherwise, subsets $W_q$ of subset $(R_i, R_j)$ are constructed as shown in the grouping labeled reference number 2502. The 8D constellation of FIG. 24 has an intra-subset MSED of 4, its trellis subsets $(R_i, R_j)$ have an intra-subset MSED of 16, and its block subsets $W_q$ have an intra-subset MSED of 32.

The above partitioning of FIGS. 24 and 25 have the desirable property that, in contrast to the partitioning of the 4D constellation of FIG. 23, each block subset $W_q$ is invariant to 180 degree rotations. Furthermore, when a subset $W_q$ of $(R_i, R_j)$ is rotated by 90 or 270 degrees, it becomes the $W_q$ of a different $(R_i, R_j)$. Had we not used two sets of rules as shown in FIG. 25 for partitioning 8D trellis subsets $(R_i, R_j)$, this latter property would not be valid for some block subsets. This property, and the property of invariance to 180 rotations, are advantageously used in accordance with the invention to design the rotationally invariant, multi-level codes described below.

Figure 26:
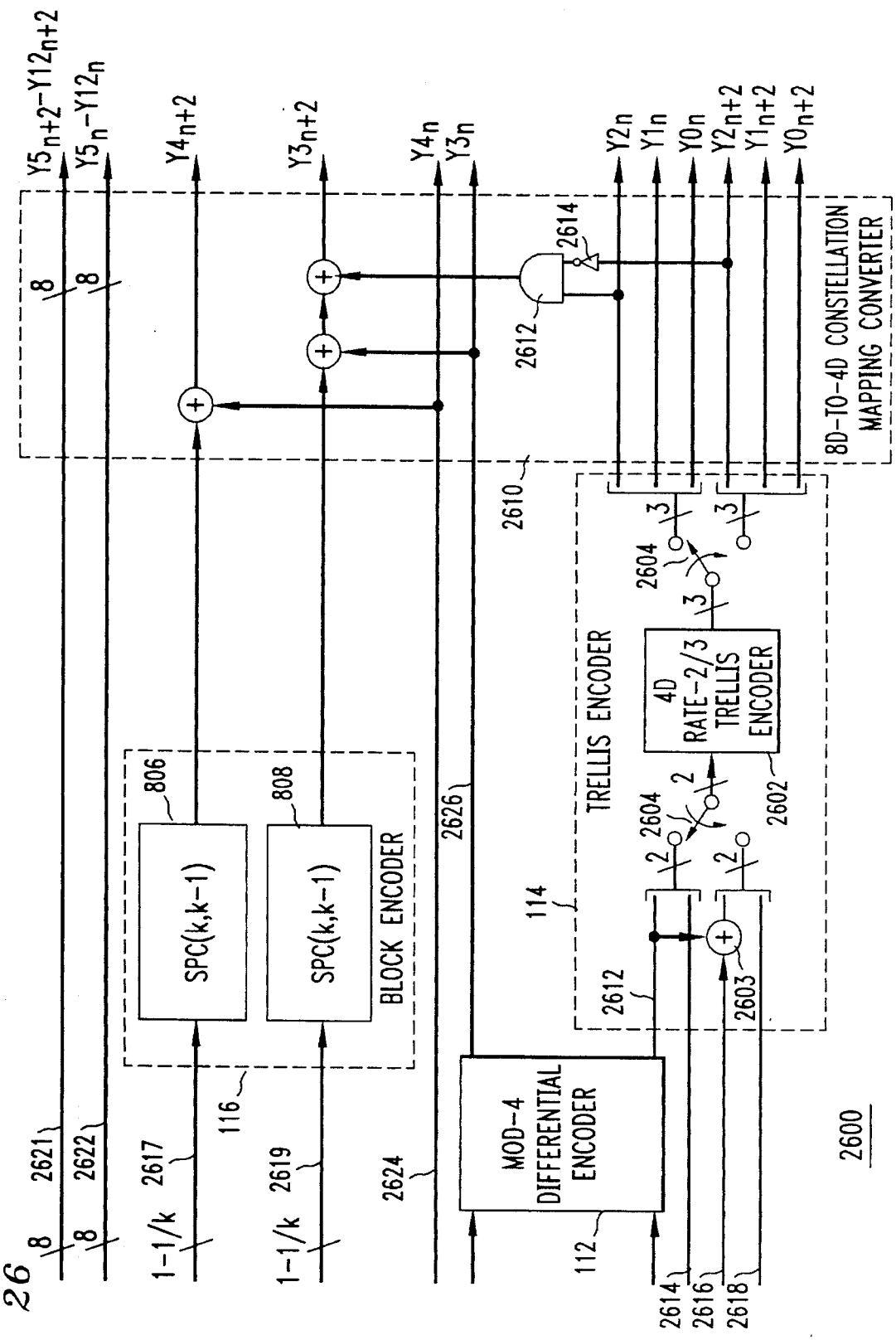
FIG. 26 is a partially schematic diagram of an illustrative embodiment of the encoder of FIG. 1 for use with the constellation of FIG. 24.

FIG. 26 shows an exemplary encoder 2600 for implementing encoder 106 of FIG. 1 that is based on the converted 8D trellis code. Encoder 2600 includes a Mod-4 differential encoder 112; trellis encoder 114 having a 4D rate ⅔ trellis encoder 2602, an exclusive-or gate 2603, and switching circuitry 2604; block encoder 116 having two SPC (k, k−1) encoders 806 and 808; and an 8D-to-4D constellation mapping converter 2610. Constellation mapping converter 2610 includes an AND gate 2612, an inverter 2614, and Exclusive-OR gates.

Encoder 2600 typically receives twenty-four input bits per 8D signaling interval. However, in one out of every k 8D signaling intervals, encoder 2600 receives only twenty-two input bits. In this interval, block encoder 116 does not receive any input bits. Two of the input bits are provided at the inputs to Mod-4 differential encoder 112. The two input bits to differential encoder 112 in the present 8D signaling interval are denoted as $I1_n$ and $I0_n$. The two bits output from the differential encoder in the present 8D signaling interval are denoted as $I1_n'$ and $I0_n'$. The function of Mod-4 differential encoder 112 is given by the equation $I1_n'I0_n' = (I1_{n-4}'I0_{n-4}' + I1_nI0_n)$ mod $1000_{base\ 2}$, where n−4 denotes the previous 8D signaling interval.

One of the two bits output from Mod-4 differential encoder 112 is provided to 8D trellis encoder 114 via line 2612. Trellis encoder 114 receives another three input bits on lines 2614, 2616, and 2618. In order to maintain rotational invariance of trellis encoder 114, the bit received on line 2616 is Exclusive-ORed in gate 2603 with the differentially encoded bit on line 2612. The 4D rate-⅔ trellis encoder 2602 of trellis encoder 114 (as shown in FIGS. 27–29) then receives the data bits from lines 2612 and 2614 and outputs bits $Y2_n$, $Y1_n$ and $Y0_n$, which are used to specify a first 4D trellis subset $R_i$, where i is the decimal equivalent of the output bit pattern $Y2_nY1_nY0_n$. Trellis encoder 2602 receives a second set of bits from lines 2616 and 2618 and outputs bits $Y2_{n+2}$, $Y1_{n+2}$ and $Y0_{n+2}$, which are used to specify a second 4D trellis subset $R_j$. Together, the six bits $Y2_n$, $Y1_n$, $Y0_n$, $Y2_{n+2}$, $Y1_{n+2}$ and $Y0_{n+2}$ output from trellis encoder 114 identify an 8D trellis subset $(R_i, R_j)$. One skilled in the art will appreciate that the novel trellis encoding arrangement described above will ensure that a valid sequence of trellis subsets will become another valid sequence upon a rotation of the constellation by 90, 180, or 270 degrees, and that the input bits associated with a valid sequence can be recovered by the receiver irrespective of the rotation. The trellis encoders of FIGS. 27–29 also are designed to maximize the trellis distance, as described above with respect to the trellis encoder of FIG. 5.

Referring again to FIG. 26, two of the twenty-four input bits received in each 8D interval by encoder 2600 are input to block encoder 116. It is important to note that these two bits are not differentially encoded. As mentioned above, block encoder 116 is a DPC encoder that consists of two SPC(k, k−1) encoders 806 and 808. The SPC code has a frame length of k bits, where k illustratively has a value equal to four. For each of the first k−1 8D signal intervals in a frame of k 8D signal intervals, each SPC encoder receives one input bit and passes that bit to the output. In the kth 8D signal interval of that frame, the SPC encoder does not receive any input bit, but outputs a redundant bit whose value is equal to the Exclusive-ORed value of the previous k−1 input bits received during that frame. Thus, each SPC encoder receives, on average, 1−1/k bits per 8D signaling interval via lines 2617 or 2619. The two bits output from block encoder 116 are provided to constellation mapping converter 2610, and are used to select a block subset $W_q$ of the selected trellis subset $(R_i, R_j)$, where q is the decimal equivalent of the pattern of the two output bits from the DPC encoder (reading from top to bottom).

The operation of block encoder 116 in selecting a block subset $W_q$ also can be understood from the state diagram of FIG. 9. At the beginning of a frame, block encoder 116 is at a present state 0. Depending on the value of the two input bits received in the first 8D interval of that frame, block encoder 116 will go to one of the four possible next states 0, 1, 2, and 3 and will output a corresponding one of the four block subsets $W_0$, $W_1$, $W_2$, and $W_3$ of the selected trellis subset $(R_i, R_j)$ (identified by trellis subset selector 120 of FIG. 1). During the second 8D interval of that frame, depending on the input values of the two input bits and the present state in that interval, block encoder 116 will again go to one of the four possible next states and output another corresponding one of the four block subsets. This process is repeated for the following k–3 intervals. In the last kth interval of the frame, there are no bits input to block encoder 116. In this case, block encoder 116 will go to a next state (which turns out to always be state 0) determined by the values of the two redundant bits and the then present state, and will output a corresponding block subset.

The remaining bits on the group of lines labeled 2620 and 2621, and on line 2624, and the differentially encoded bit on line 2626, are used to select an 8D point from the selected block subset. This point selection process, together with the trellis subset selection and block subset selection can be done jointly by 8D-to-4D constellation mapping converter 2610 and 4D-to-2D constellation mapping converter 3000 shown in FIG. 30. The 8D-to-4D constellation mapping converter 2610 converts the 8D constellation mapping into a pair of 4D constellation mappings. Constellation mapping converter 2610 operates in a manner similar to that described for constellation mapping converter 1000 of FIG. 10. The output bits of 8D-to-4D constellation mapping converter 2610 will be divided into two groups, the first group including the twelve bits having a subscript n (e.g., $Y0_n$, $Y1_n$), and the second group including the twelve bits having a subscript n+2 (e.g., $Y0_{n+2}$, $Y1_{n+2}$).

Figure 30:
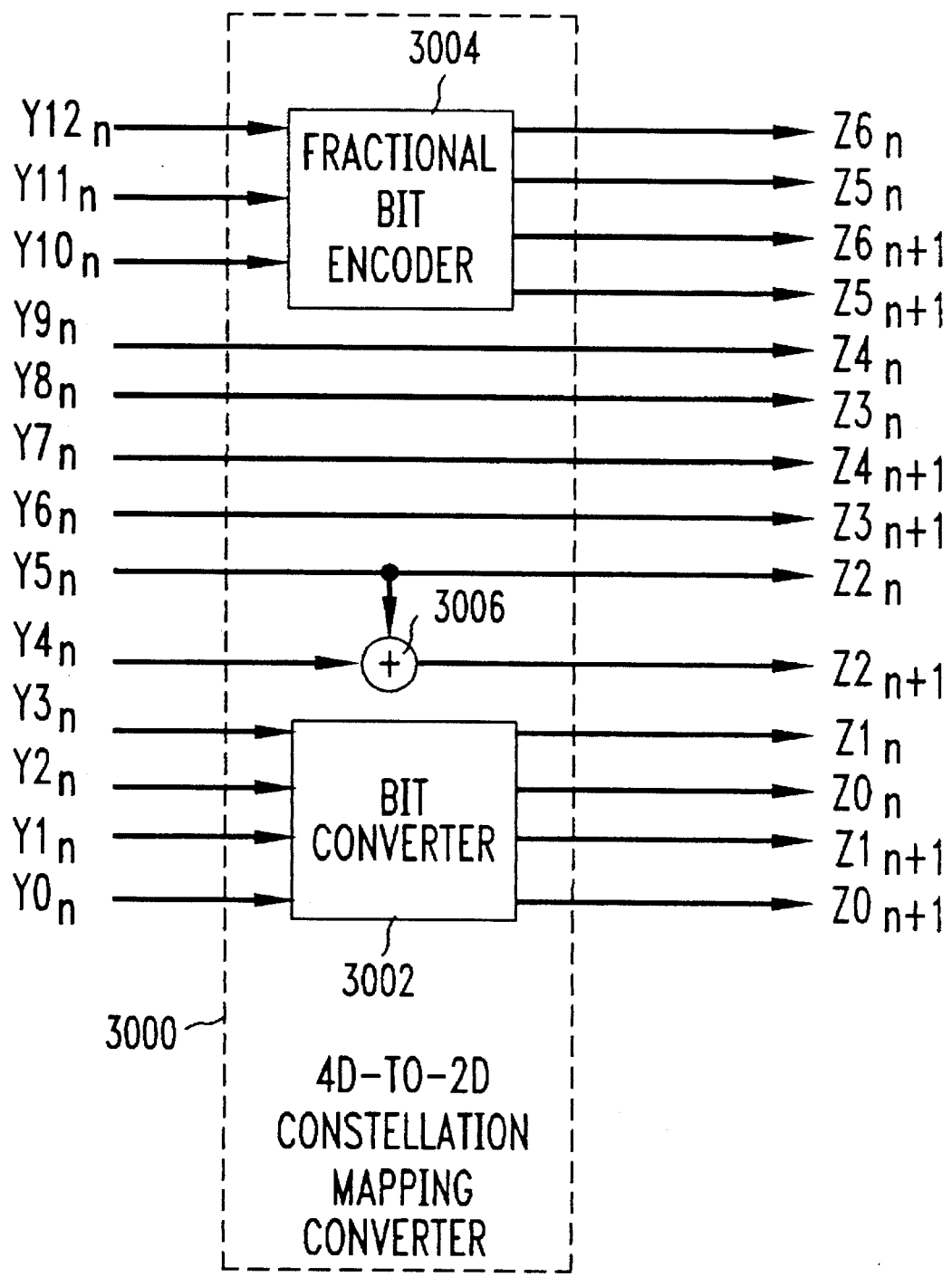
FIG. 30 is a block diagram of an illustrative 4D-to-2D constellation mapping converter.

Each group of bits output from 8D-to-4D constellation mapping converter 2610 is provided, in time sequence, to the inputs of a 4D-to-2D constellation mapping converter 3000 shown in FIG. 30. Constellation mapping converter 3000 includes a bit converter 3002, a fractional bit encoder 3004, and an Exclusive-OR gate 3006. Bit converter 3002 receives four bits $Y3_n$, $Y2_n$, $Y1_n$, and $Y0_n$ and converts them to four output bits according to the table shown in FIG. 31. Fractional bit encoder 3004 encodes the three bits $Y12_n$, $Y11_n$, and $Y10_n$ according to the table shown in FIG. 32 to output four bits. The output of constellation mapping converter 3000 is grouped into two groups, each group being provided to a 2D 96-QAM constellation mapper shown in FIGS. 21 and 22.

It is to be understood that 8D-to-4D constellation mapping converter 2610, 4D-to-2D constellation mapping converter 3000, and the 2D 96-QAM constellation mapper shown in FIGS. 21 and 22 are designed together with each other and with differential encoder 112, trellis encoder 114, and block encoder 116 of FIG. 26. This ensures that the a valid sequence of signal points becomes another valid sequence of signal points after a rotation by a phase angle corresponding to a phase symmetry of the constellation. This also ensures that the input bits associated with a valid sequence in the transmitter can still be recovered in the receiver after such a rotation.

It is to be understood that, in this embodiment, the number bits identified as $m_1$, $m_2$, and $m_3$ in FIG. 1 are 4, 2-2/k, and 18, respectively, each 8D signaling interval.

One skilled in the art will appreciate that the operations of decoder 202 of FIG. 2 in decoding signals received from encoder 2600 over channel 110 are similar to those described above with respect to the 8-PSK embodiment. Block decoder 212, in this embodiment, uses the state diagram shown in FIG. 9 to perform the decoding operation.

It will be apparent to one skilled in the art that other modifications can be made to the described embodiment without departing from the scope of the invention. For example, although I have disclosed three embodiments of codes constructed in accordance with the invention, in view of the present disclosure, other such codes could be readily constructed. Also, constellations of different sizes and different number of phase ambiguities could be used, and a different number of input bits could be used for each signaling interval. In still other embodiments, the constellations could be formed using conventional constellation shaping techniques.

I claim:

1. A rotationally invariant, multilevel coding method for selecting a sequence of signal points from a multilevel, 2N-dimensional constellation to represent a sequence of input bits, N representing a positive integer, the constellation having at least three phase symmetries and being partitioned into a first group of subsets, and each of the subsets of the first group being partitioned into a second group of subsets, the method comprising the steps of:

applying, during each 2N-dimensional signaling interval, first and second portions of the input bits to a first encoder and a second encoder, respectively, to generate first and second groups of encoded bits;

specifying, in response to the first group of encoded bits, a first subset from the first group of subsets of the constellation;

identifying, in response to the second group of encoded bits, a second subset from the second group of subsets of the specified first subset;

selecting, in response to a third portion of the input bits, a 2N- dimensional signal point from the identified second subset; and generating an output signal representing a sequence of successive, multilevel, 2N-dimensional signal points thus selected, wherein the constellation is partitioned such that each of respective subsets in the first group of subsets has an intra-subset minimum square Euclidean distance (MSED) less than the MSEDs of each of the subsets in the corresponding second group of subsets into which the respective first group of subsets is partitioned;

the subsets in the first and second groups of subsets being rotationally invariant to the same amount of phase rotation of the 2N-dimensional constellation such that a valid sequence of signal points becomes another valid sequence of signal points after a rotation corresponding to a phase symmetry of the 2N-dimensional constellation.

2. The method of claim 1 wherein the specifying and identifying steps are performed such that for two different groups of encoded bits output from the first encoder and for the same group of encoded bits output from the second encoder, the two corresponding identified second subsets are obtainable from each other through a phase rotation of the constellation.

3. The method of claim 1 wherein the first and second encoders are redundancy encoders.

4. The method of claim 1 wherein the first encoder is a trellis encoder.

5. The method of claim 4 wherein the trellis encoder utilizes a trellis code of a predetermined dimensionality and wherein the trellis code is converted from a second trellis code of lower dimensionality.

6. The method of claim 1 wherein the second encoder is a block encoder.

7. The method of claim 6 wherein the block encoder comprises at least one single-parity-check encoder.

8. The method of claim 1 wherein the 2N-dimensional constellation is constructed from a QAM constellation having four phase ambiguities.

9. The method of claim 1 wherein the 2N-dimensional constellation is constructed from an M-PSK constellation having at least three phase ambiguities.

10. A rotationally invariant multilevel coding method for selecting a sequence of signal points from a multilevel, 2N-dimensional constellation to represent a sequence of input bits, the constellation having at least three phase symmetries and being partitioned into a first group of subsets, and each of the subsets of the first group being partitioned into a second group of subsets, the method comprising the steps of:

differentially encoding, during each 2N-dimensional signaling interval, a first portion of the input bits to generate a plurality of differentially encoded bits;

applying, during each 2N-dimensional signaling interval, a second portion of the input bits, together with at least one of the differentially encoded bits, to a first encoder to generate a first group of encoded bits;

applying, during each 2N-dimensional signaling interval, a third portion of the input bits to a second encoder, to generate a second group of encoded bits;

specifying, in response to the first group of encoded bits, a first subset from the first group of subsets of the 2N-dimensional constellation;

identifying in response to the second group of encoded bits, a second subset from the second group of subsets of the specified first subset;

selecting, in response to a fourth portion of the input bits, together with at least one of the differentially encoded bits, a 2N-dimensional signal point from the identified second subset; and generating an output signal representing a sequence of successive, multilevel, 2N-dimensional signal points thus selected, the multilevel coding method providing rotational invariance wherein a valid sequence of signal points becomes another valid sequence of signal points after a phase rotation corresponding to a phase symmetry of the 2N-dimensional constellation corresponding to a phase symmetry of the 2N-dimensional constellation.

11. The method of claim 10 wherein the first encoder is a trellis encoder.

12. The method of claim 11 wherein the trellis encoder utilizes a trellis code of a predetermined dimensionality and wherein the trellis code is derived from a second trellis code of lower dimensionality.

13. The method of claim 13 wherein the second encoder is a block encoder.

14. The method of claim 13 wherein the block encoder comprises at least one single-parity-check encoder.

15. The method of claim 10 wherein the 2N-dimensional constellation is constructed from a QAM constellation having four phase ambiguities.

16. The method of claim 10 wherein the 2N-dimensional constellation is constructed from an M-PSK constellation having at least three phase ambiguities.

17. A rotationally invariant, multilevel coding apparatus for transmitting a sequence of signal points selected from a multilevel, 2N-dimensional constellation to represent a sequence of input bits, N representing a positive integer, the 2N-dimensional constellation having at least three phase symmetries and being partitioned into a first group of subsets, and each of the subsets of the first group being partitioned into a second group of subsets, each of respective subsets in the first group of subsets having an intra-subset minimum square Euclidean distance (MSED) less than the MSEDs of each of the subsets in the corresponding second group of subsets into which the respective first group of subsets is partitioned, the apparatus comprising:

first means for encoding, during each 2N-dimensional signaling interval, a first portion of the input bits to generate a first group of encoded bits;

second means for encoding, during each 2N-dimensional signaling interval, a second portion of the input bits to generate a second group of encoded bits;

means for specifying, in response to the first group of encoded bits, a first subset from the first group of subsets of the 2N-dimensional constellation;

means for identifying, in response to the second group of encoded bits, a second subset from the second group of subsets of the specified first subset;

means for selecting, in response to a third portion of the input bits, a 2N-dimensional signal point from the identified second subset; and means for generating a multilevel output signal representing a sequence of successive selected multilevel, 2N-dimensional signal points, the coding apparatus providing rotational invariance wherein the 2N-dimensional constellation is partitioned such that the subsets in the first and second groups of subsets are invariant to equal amounts of phase rotation of the 2N-dimensional constellation, such that a valid sequence of signal points becomes another valid sequence of signal points after a rotation corresponding to a phase symmetry of the 2N-dimensional constellation.

18. The apparatus of claim 17 wherein the means for identifying operates such that for two different groups of encoded bits output from the first encoder and for the same group of encoded bits output from the second encoder, each of the two corresponding identified second subsets is obtainable from the other identified second subset through a phase rotation of the constellation.

19. The apparatus of claim 17 wherein the first encoder is a trellis encoder.

20. The apparatus of claim 19 wherein the trellis encoder utilizes a trellis code of a predetermined dimensionality and wherein the trellis code is derived from a second trellis code of lower dimensionality.

21. The apparatus of claim 17 wherein the second encoder is a block encoder.

22. The apparatus of claim 21 wherein the block encoder comprises at least one single-parity-check encoder.

23. The apparatus of claim 17 wherein the 2N-dimensional constellation is constructed from a QAM constellation having four phase ambiguities.

24. The apparatus of claim 17 wherein the 2N-dimensional constellation is constructed from an M-PSK constellation having at least three phase ambiguities.

25. A rotationally invariant, multilevel receiver apparatus for processing a received signal that was generated by encoding, during each 2N-dimensional signaling interval, N representing a positive integer, first and second portions of a plurality of input bits to respectively generate first and second groups of encoded bits, and then selecting, in response to the first and second groups of encoded bits and a third portion of the input bits, respectively, a first subset of a constellation, a second subset of the first subset, and a signal point of the second subset, each of respective subsets in the first group of subsets having an intra-subset minimum square Euclidean distance (MSED) less than the MSEDs of each of the subsets in the corresponding second group of subsets into which the respective first group of subsets is partitioned, the constellation having at least three phase ambiguities and being partitioned such that the first and second subsets are invariant to equal amounts of phase rotation of the constellation, wherein a valid sequence of successive multilevel channel signal points are generated as another valid sequence of multilevel signal points in response to a phase rotation corresponding to a phase symmetry of the constellation, the receiver apparatus comprising:

a receiver including a decoder for receiving a multilevel encoded signal and for generating a decoded signal in response to the multilevel encoded signal, the decoded signal representing the plurality of input bits.

26. The apparatus of claim 25 wherein said input bits are differentially encoded and the receiver apparatus further includes a differential decoder.

* * * * *

UNITED STATES PATENT AND TRADEMARK OFFICE
CERTIFICATE OF CORRECTION

PATENT NO. : 5,548,615
DATED : August 20, 1996
INVENTOR(S) : Lee-Fang Wei

It is certified that error appears in the above-identified patent and that said Letters Patent is hereby corrected as shown below:

Column 17, line 7 after "bits," insert --N representing a positive integer,--
before "constellation" insert --2N-dimensional--
line 10 after "subsets," insert --each of respective subsets in the first group of subsets having an intra-subset minimum square Euclidean distance (MSED) less than the MSEDs of each of the subsets in the corresponding second group of subsets into which the respective first group of subsets is partitioned,--
line 40 change "constellation corresponding to a phase" to --constellation.--
line 41 delete.

Signed and Sealed this

Sixth Day of April, 1999

*Attest:*

Q. TODD DICKINSON

*Attesting Officer*  Acting Commissioner of Patents and Trademarks